(12) United States Patent
Shahana et al.

(10) Patent No.: US 11,932,347 B2
(45) Date of Patent: Mar. 19, 2024

(54) CONTROL DEVICE AND TRANSMISSION SYSTEM

(71) Applicant: Shimano Inc., Osaka (JP)

(72) Inventors: Satoshi Shahana, Osaka (JP); Mitsuhiko Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 897 days.

(21) Appl. No.: 16/574,796

(22) Filed: Sep. 18, 2019

(65) Prior Publication Data

US 2020/0102050 A1  Apr. 2, 2020

(30) Foreign Application Priority Data

Oct. 2, 2018   (JP) ................. 2018-187293

(51) Int. Cl.
| | |
|---|---|
| B62M 25/08 | (2006.01) |
| B60L 50/20 | (2019.01) |
| B62J 45/20 | (2020.01) |
| B62M 9/122 | (2010.01) |
| H02J 7/14 | (2006.01) |
| H04B 1/3827 | (2015.01) |
| B62J 45/40 | (2020.01) |

(52) U.S. Cl.
CPC .............. *B62M 25/08* (2013.01); *B60L 50/20* (2019.02); *B62M 9/122* (2013.01); *H02J 7/1407* (2013.01); *H04B 1/3827* (2013.01); *B60L 2200/12* (2013.01); *B62J 45/20* (2020.02); *B62J 45/40* (2020.02)

(58) Field of Classification Search
CPC ...... B62M 25/08; B62M 9/122; B62M 9/123; B62M 6/45; B62M 6/55; B62M 2025/006; B60L 50/20; B60L 2200/12; B60L 15/2081; B60L 2240/642; Y02T 90/16; B62J 45/20

See application file for complete search history.

(56) References Cited

U.S. PATENT DOCUMENTS 5,199,929 A * 4/1993 Stites ....................... B62M 9/04
                                                                    474/54
5,213,548 A * 5/1993 Colbert .................. B62M 25/08
                                                                    280/238

(Continued)

FOREIGN PATENT DOCUMENTS

DE   202014102666 U1 * 10/2014 ............. B62M 1/24
EP   3 068 683 A1   2/2020

(Continued)

*Primary Examiner* — Kevin Hurley
*Assistant Examiner* — Hosam Shabara
(74) *Attorney, Agent, or Firm* — Global IP Counselors, LLP

(57) ABSTRACT

A control device and a transmission system are configured to improve riding comfort of a human-powered vehicle. The control device includes an electronic controller that is configured to control a transmission device of a human-powered vehicle so that a transmission ratio at which the vehicle is started becomes equal to a designated transmission ratio. The electronic controller is configured to set the designated transmission ratio based on reference information that excludes information related to a gradient of a road surface, information related to manual operation of the transmission device, and information related to propulsion assistance of the human-powered vehicle.

40 Claims, 7 Drawing Sheets

(56) References Cited

U.S. PATENT DOCUMENTS

| | | | | |
|---|---|---|---|---|
| 5,254,044 A | * | 10/1993 | Anderson | B62M 25/08 474/70 |
| 5,266,065 A | * | 11/1993 | Ancarani Restelli | B62J 45/20 474/78 |
| 5,644,511 A | * | 7/1997 | McWhorter | B62J 50/22 474/69 |
| 6,012,999 A | * | 1/2000 | Patterson | B62M 9/122 474/104 |
| 6,015,360 A | * | 1/2000 | Chang | B62M 9/123 474/82 |
| 6,042,495 A | * | 3/2000 | Patterson | B62M 9/132 474/78 |
| 6,047,230 A | * | 4/2000 | Spencer | B62M 9/123 474/70 |
| 6,714,849 B1 | * | 3/2004 | Ferrero | B62M 25/08 701/1 |
| 11,046,392 B2 | * | 6/2021 | Shahana | B62M 25/08 |
| 2005/0098978 A1 | * | 5/2005 | Kitamura | B62M 25/045 280/260 |
| 2009/0164076 A1 | * | 6/2009 | Vasiliotis | B62M 6/40 701/55 |
| 2010/0198453 A1 | * | 8/2010 | Dorogusker | G06F 1/1626 340/427 |
| 2012/0130603 A1 | * | 5/2012 | Simpson | B62M 25/08 701/51 |
| 2013/0139634 A1 | * | 6/2013 | Tauchi | B62M 25/08 74/473.13 |
| 2015/0088389 A1 | | 3/2015 | Gao | |
| 2015/0120119 A1 | * | 4/2015 | Tauchi | B62M 15/00 701/22 |
| 2015/0137591 A1 | * | 5/2015 | Fusari | B62M 25/08 307/9.1 |
| 2015/0307157 A1 | * | 10/2015 | Gao | B62M 6/45 701/52 |
| 2015/0329161 A1 | * | 11/2015 | Fujii | B62J 3/14 701/64 |
| 2015/0345620 A1 | | 12/2015 | Watarai | |
| 2016/0016624 A1 | * | 1/2016 | Abe | B62J 50/22 701/52 |
| 2016/0031527 A1 | * | 2/2016 | Bortolozzo | B62M 9/133 701/58 |
| 2017/0225742 A1 | * | 8/2017 | Hancock | B62J 45/412 |
| 2018/0036586 A1 | * | 2/2018 | Cristofori | A63B 22/0087 |
| 2018/0056812 A1 | * | 3/2018 | Hamann | B60W 50/12 |
| 2018/0118211 A1 | * | 5/2018 | Tsuchizawa | B62M 25/08 |
| 2018/0127059 A1 | * | 5/2018 | Lin | B62M 9/122 |
| 2018/0148127 A1 | * | 5/2018 | Sato | B62M 6/90 |
| 2018/0154982 A1 | * | 6/2018 | Gong | B62M 6/50 |
| 2018/0170482 A1 | * | 6/2018 | Niki | F16H 3/085 |
| 2018/0178881 A1 | * | 6/2018 | Miglioranza | B62M 9/122 |
| 2018/0180640 A1 | * | 6/2018 | Miglioranza | G01P 3/488 |
| 2018/0237104 A1 | * | 8/2018 | Pasqua | B62M 9/125 |
| 2018/0319460 A1 | * | 11/2018 | Giacometti | B62M 9/132 |
| 2018/0362115 A1 | * | 12/2018 | Tsuchizawa | B62M 6/50 |
| 2019/0031284 A1 | * | 1/2019 | Fuchs | A63B 22/0605 |

FOREIGN PATENT DOCUMENTS

| | | |
|---|---|---|
| JP | 9-240568 A | 9/1997 |
| JP | 10-511621 A | 11/1998 |
| JP | 2011-161967 A | 8/2011 |
| JP | 2015-63222 A | 4/2015 |
| JP | 2015-223996 A | 12/2015 |

* cited by examiner

CONTROL DEVICE AND TRANSMISSION SYSTEM

CROSS-REFERENCE TO RELATED APPLICATIONS

This application claims priority to Japanese Patent Application No. 2018-187293, filed on Oct. 2, 2018. The entire disclosure of Japanese Patent Application No. 2018-187293 is hereby incorporated herein by reference.

BACKGROUND

Technical Field

The present invention generally relates to a control device and a transmission system.

Background Information

A transmission system that controls a transmission device of a human-powered vehicle is known. A prior art transmission system controls a transmission device so that the rotation speed of a crank of a human-powered vehicle is maintained in a predetermined range in accordance with a transmission condition that is specified based on the rotation speed of the crank and a threshold value. Japanese National Phase Laid-Open Patent Publication No. 10-511621 (Patent document 1) discloses an example of a prior art transmission system.

SUMMARY

It is desirable that the rider can ride a human-powered vehicle comfortably. One object of the present disclosure is to provide a control device and a transmission system that improve riding comfort of a human-powered vehicle.

A control device in accordance with a first aspect of the present disclosure comprises an electronic controller that is configured to control a transmission device of a human-powered vehicle so that a transmission ratio at which the vehicle is started becomes equal to a designated transmission ratio. The electronic controller is configured to set the designated transmission ratio based on reference information that excludes information related to a gradient of a road surface, information related to manual operation of the transmission device, and information related to propulsion assistance of the human-powered vehicle.

With the control device according to the first aspect, the designated transmission ratio specifying the transmission ratio at which the human-powered vehicle is started is set based on the reference information. This allows the rider riding the human-powered vehicle to stably start the human-powered vehicle. Thus, riding comfort of the human-powered vehicle is improved.

In accordance with a second aspect of the present disclosure, the control device according to the first aspect is configured so that the reference information includes at least one of vehicle stop information related to a stopping state of the human-powered vehicle, riding information related to riding of the human-powered vehicle, rider information related to a rider riding the human-powered vehicle, and environment information related to a riding environment of the human-powered vehicle.

With the control device according to the second aspect, riding comfort of the human-powered vehicle is improved.

In accordance with a third aspect of the present disclosure, the control device according to the second aspect is configured so that the vehicle stop information includes information related to a transmission ratio at which the human-powered vehicle is stopped.

With the control device according to the third aspect, the designated transmission ratio is set based on information related to the transmission ratio at which the human-powered vehicle is stopped. The information related to the transmission ratio at which the human-powered vehicle is stopped readily reflects the state of the rider riding the human-powered vehicle. Thus, the designated transmission ratio is set based on information reflecting the state of the rider. This allows the rider to stably start the human-powered vehicle. Thus, riding comfort of the human-powered vehicle is improved.

In accordance with a fourth aspect of the present disclosure, in the control device according to the third aspect, the electronic controller is configured to maintain the designated transmission ratio upon determining the transmission ratio at which the human-powered vehicle is stopped is larger than or equal to the designated transmission ratio.

With the control device according to the fourth aspect, the transmission device is appropriately controlled so that the transmission ratio at which the human-powered vehicle is started becomes equal to the designated transmission ratio corresponding to the transmission ratio at which the human-powered vehicle was stopped. Thus, riding comfort of the human-powered vehicle is improved.

In accordance with a fifth aspect of the present disclosure, in the control device according to the third or fourth aspect, the electronic controller is configured to set the transmission ratio at which the human-powered vehicle is stopped as the designated transmission ratio upon determining the transmission ratio at which the human-powered vehicle is stopped is smaller than the designated transmission ratio.

With the control device according to the fifth aspect, the transmission device is appropriately controlled so that the transmission ratio at which the human-powered vehicle is started becomes equal to the designated transmission ratio corresponding to the transmission ratio at which the human-powered vehicle was stopped. Thus, riding comfort of the human-powered vehicle is improved.

In accordance with a sixth aspect of the present disclosure, the control device according to any one of the second to fifth aspects is configured so that the riding information includes information related to a load on the human-powered vehicle.

With the control device according to the sixth aspect, the designated transmission ratio is set based on information related to a load on the human-powered vehicle. The information related to a load on the human-powered vehicle readily reflects the state of the rider riding the human-powered vehicle. Thus, the designated transmission ratio is set based on information reflecting the state of the rider. This allows the rider to stably start the human-powered vehicle. Thus, riding comfort of the human-powered vehicle is improved.

In accordance with a seventh aspect of the present disclosure, in the control device according to the sixth aspect, the electronic controller is configured to set the designated transmission ratio so that the transmission ratio at which the vehicle is started is decreased upon determining the load on the human-powered vehicle is larger than or equal to a first load.

With the control device according to the seventh aspect, the transmission device is appropriately controlled so that the transmission ratio at which the human-powered vehicle is started becomes equal to the designated transmission ratio corresponding to a load on the human-powered vehicle. Thus, riding comfort of the human-powered vehicle is improved.

In accordance with an eighth aspect of the present disclosure, in the control device according to the sixth or seventh aspect, the electronic controller is configured to maintain the designated transmission ratio or set the designated transmission ratio so that the transmission ratio at which the vehicle is started is increased upon determining the load on the human-powered vehicle is smaller than a second load.

With the control device according to the eighth aspect, the transmission device is appropriately controlled so that the transmission ratio at which the human-powered vehicle is started becomes equal to the designated transmission ratio corresponding to a load on the human-powered vehicle. Thus, riding comfort of the human-powered vehicle is improved.

In accordance with a ninth aspect of the present disclosure, the control device according to any one of the sixth to eighth aspects is configured so that the load on the human-powered vehicle includes at least one of cadence, torque acting on a crank of the human-powered vehicle, and power.

With the control device according to the ninth aspect, riding comfort of the human-powered vehicle is improved.

In accordance with a tenth aspect of the present disclosure, the control device according to any one of the second to ninth aspects is configured so that the riding information includes information related to an elevation gain of the human-powered vehicle.

With the control device according to the tenth aspect, the designated transmission ratio is set based on information related to an elevation gain of the human-powered vehicle. The information related to an elevation gain of the human-powered vehicle readily reflects the state of the rider riding the human-powered vehicle. Thus, the designated transmission ratio is set based on information reflecting the state of the rider. This allows the rider to stably start the human-powered vehicle. Thus, riding comfort of the human-powered vehicle is improved.

In accordance with an eleventh aspect of the present disclosure, in the control device according to the tenth aspect, the electronic controller is configured to set the designated transmission ratio so that the transmission ratio at which the vehicle is started is decreased upon determining the elevation gain is larger than or equal to a first elevation gain.

With the control device according to the eleventh aspect, the transmission device is appropriately controlled so that the transmission ratio at which the human-powered vehicle is started becomes equal to the designated transmission ratio corresponding to an elevation gain of the human-powered vehicle. Thus, riding comfort of the human-powered vehicle is improved.

In accordance with a twelfth aspect of the present disclosure, in the control device according to the tenth or eleventh aspect, the electronic controller is configured to maintain the designated transmission ratio or set the designated transmission ratio so that the transmission ratio at which the vehicle is started is increased upon determining the elevation gain is smaller than a second elevation gain.

With the control device according to the twelfth aspect, the transmission device is appropriately controlled so that the transmission ratio at which the human-powered vehicle is started becomes equal to the designated transmission ratio corresponding to an elevation gain of the human-powered vehicle. Thus, riding comfort of the human-powered vehicle is improved.

In accordance with a thirteenth aspect of the present disclosure, the control device according to any one of the second to twelfth aspects is configured so that the rider information includes fatigue information related to fatigue of the rider.

With the control device according to the thirteenth aspect, the designated transmission ratio is set based on fatigue information. The fatigue information readily reflects the state of the rider riding the human-powered vehicle. Thus, the designated transmission ratio is set based on information reflecting the state of the rider. This allows the rider to stably start the human-powered vehicle. Thus, riding comfort of the human-powered vehicle is improved.

In accordance with a fourteenth aspect of the present disclosure, the control device according to the thirteenth aspect is configured so that the fatigue information includes information related to a change in biological information.

With the control device according to the fourteenth aspect, the designated transmission ratio is set based on information related to a change in biological information. This allows the rider riding the human-powered vehicle to stably start the human-powered vehicle. Thus, riding comfort of the human-powered vehicle is improved.

In accordance with a fifteenth aspect of the present disclosure, the control device according to the fourteenth aspect is configured so that the biological information includes information related to a heart rate of the rider.

With the control device according to the fifteenth aspect, the designated transmission ratio is set based on information related to a heart rate of the rider riding the human-powered vehicle. This allows the rider to stably start the human-powered vehicle. Thus, riding comfort of the human-powered vehicle is improved.

In accordance with a sixteenth aspect of the present disclosure, the control device according to the fifteenth aspect is configured so that the electronic controller sets the designated transmission ratio so that the transmission ratio at which the vehicle is started is decreased upon determining the heart rate is increased by a first rate or greater.

With the control device according to the sixteenth aspect, the transmission device is appropriately controlled so that the transmission ratio at which the human-powered vehicle is started becomes equal to the designated transmission ratio corresponding to a heart rate of the rider riding the human-powered vehicle. Thus, riding comfort of the human-powered vehicle is improved.

In accordance with a seventeenth aspect of the present disclosure, the control device according to any one of the thirteenth to sixteenth aspects is configured so that the fatigue information includes information related to a change in a load on the human-powered vehicle.

With the control device according to the seventeenth aspect, the designated transmission ratio is set based on information related to a change in a load on the human-powered vehicle. This allows the rider riding the human-powered vehicle to stably start the human-powered vehicle. Thus, riding comfort of the human-powered vehicle is improved.

In accordance with an eighteenth aspect of the present disclosure, the control device according to the seventeenth aspect is configured so that the electronic controller sets the designated transmission ratio so that the transmission ratio at which the vehicle is started is decreased upon determining the load on the human-powered vehicle is increased by a second rate or greater.

With the control device according to the eighteenth aspect, the transmission device is appropriately controlled so that the transmission ratio at which the human-powered vehicle is started becomes equal to the designated transmission ratio corresponding to a load on the human-powered vehicle. Thus, riding comfort of the human-powered vehicle is improved.

In accordance with a nineteenth aspect of the present disclosure, the control device according to the seventeenth or eighteenth aspect is configured so that the load on the human-powered vehicle includes at least one of cadence, torque acting on a crank of the human-powered vehicle, and power.

With the control device according to the nineteenth aspect, riding comfort of the human-powered vehicle is improved.

In accordance with a twentieth aspect of the present disclosure, the control device according to any one of the thirteenth to nineteenth aspects is configured so that the fatigue information includes information related to a driving time.

With the control device according to the twentieth aspect, the designated transmission ratio is set based on information related to a driving time. This allows the rider riding the human-powered vehicle to stably start the human-powered vehicle. Thus, riding comfort of the human-powered vehicle is improved.

In accordance with a twenty-first aspect of the present disclosure, in the control device according to the twentieth aspect, the controller is configured to set the designated transmission ratio so that the transmission ratio at which the vehicle is started is decreased upon determining the driving time is longer than or equal to a first driving time.

With the control device according to the twenty-first aspect, the transmission device is appropriately controlled so that the transmission ratio at which the human-powered vehicle is started becomes equal to the designated transmission ratio corresponding to a riding time. Thus, riding comfort of the human-powered vehicle is improved.

In accordance with a twenty-second aspect of the present disclosure, in the control device according to the twentieth or twenty-first aspect, the electronic controller is configured to maintain the designated transmission ratio or set the designated transmission ratio so that the transmission ratio at which the vehicle is started is increased upon determining the driving time is shorter than a second driving time.

With the control device according to the twenty-second aspect, the transmission device is appropriately controlled so that the transmission ratio at which the human-powered vehicle is started becomes equal to the designated transmission ratio corresponding to a riding time. Thus, riding comfort of the human-powered vehicle is improved.

In accordance with a twenty-third aspect of the present disclosure, the control device according to any one of the thirteenth to twenty-second aspects is configured so that the fatigue information includes information related to a rest time.

With the control device according to the twenty-third aspect, the designated transmission ratio is set based on information related to a rest time. This allows the rider riding the human-powered vehicle to stably start the human-powered vehicle. Thus, riding comfort of the human-powered vehicle is improved.

In accordance with a twenty-fourth aspect of the present disclosure, the control device according to the twenty-third aspect is configured so that the electronic controller is configured to maintain the designated transmission ratio or set the designated transmission ratio so that the transmission ratio at which the vehicle is started is increased upon determining the rest time is longer than or equal to a first reset time.

With the control device according to the twenty-fourth aspect, the transmission device is appropriately controlled so that the transmission ratio at which the human-powered vehicle is started becomes equal to the designated transmission ratio corresponding to a rest time. Thus, riding comfort of the human-powered vehicle is improved.

In accordance with a twenty-fifth aspect of the present disclosure, in the control device according to the twenty-third or twenty-fourth aspects, the electronic controller is configured to set the designated transmission ratio so that the transmission ratio at which the vehicle is started is decreased upon determining the rest time is shorter than a second rest time.

With the electronic control device according to the twenty-fifth aspect, the transmission device is appropriately controlled so that the transmission ratio at which the human-powered vehicle is started becomes equal to the designated transmission ratio corresponding to a rest time. Thus, riding comfort of the human-powered vehicle is improved.

In accordance with a twenty-sixth aspect of the present disclosure, the control device according to any one of the thirteenth to twenty-fifth aspects is configured so that the fatigue information includes information related to an exercise amount of the rider.

With the control device according to the twenty-sixth aspect, the designated transmission ratio is set based on information related to an exercise amount of the rider riding the human-powered vehicle. This allows the rider to stably start the human-powered vehicle. Thus, riding comfort of the human-powered vehicle is improved.

In accordance with a twenty-seventh aspect of the present disclosure, in the control device according to the twenty-sixth aspect, the electronic controller is configured to set the designated transmission ratio so that the transmission ratio at which the vehicle is started is decreased upon determining the exercise amount is greater than or equal to a first exercise amount.

With the control device according to the twenty-seventh aspect, the transmission device is appropriately controlled so that the transmission ratio at which the human-powered vehicle is started becomes equal to the designated transmission ratio corresponding to an exercise amount of the rider riding the human-powered vehicle. Thus, riding comfort of the human-powered vehicle is improved.

In accordance with a twenty-eighth aspect of the present disclosure, in the control device according to the twenty-sixth or twenty-seventh aspect, the electronic controller is configured to maintain the designated transmission ratio or set the designated transmission ratio so that the transmission ratio at which the vehicle is started is increased upon determining the exercise amount is less than a second exercise amount.

With the control device according to the twenty-eighth aspect, the transmission device is appropriately controlled so that the transmission ratio at which the human-powered vehicle is started becomes equal to the designated transmission ratio corresponding to an exercise amount of the rider riding the human-powered vehicle. Thus, riding comfort of the human-powered vehicle is improved.

In accordance with a twenty-ninth aspect of the present disclosure, the control device according to any one of the second to twenty-eighth aspects is configured so that the environment information includes information related to a region in which the human-powered vehicle is ridden.

With the control device according to the twenty-ninth aspect, the designated transmission ratio is set based on information related to a region in which the human-powered vehicle is ridden. The information related to a region in which the human-powered vehicle is ridden readily reflects the state of the rider riding the human-powered vehicle. Thus, the designated transmission ratio is set based on information reflecting the state of the rider. This allows the rider to stably start the human-powered vehicle. Thus, riding comfort of the human-powered vehicle is improved.

In accordance with a thirtieth aspect of the present disclosure, in the control device according to the twenty-ninth aspect, the electronic controller is configured to maintain the designated transmission ratio or set the designated transmission ratio so that the transmission ratio at which the vehicle is started is increased upon determining the region includes an on road region.

With the control device according to the thirtieth aspect, the transmission device is appropriately controlled so that the transmission ratio at which the human-powered vehicle is started becomes equal to the designated transmission ratio corresponding to a region in which the human-powered vehicle is ridden. Thus, riding comfort of the human-powered vehicle is improved.

In accordance with a thirty-first aspect of the present disclosure, in the control device according to the twenty-ninth or thirtieth aspect, the electronic controller is configured to set the designated transmission ratio so that the transmission ratio at which the vehicle is started is decreased upon determining the region includes an off road region.

With the control device according to the thirty-first aspect, the transmission device is appropriately controlled so that the transmission ratio at which the human-powered vehicle is started becomes equal to the designated transmission ratio corresponding to a region in which the human-powered vehicle is ridden. Thus, riding comfort of the human-powered vehicle is improved.

In accordance with a thirty-second aspect of the present disclosure, the control device according to any one of the second to thirty-first aspects is configured so that the electronic controller sets the designated transmission ratio based on the reference information and the information related to a gradient of a road surface.

With the control device according to the thirty-second aspect, the designated transmission ratio is set based on the reference information and information related to a gradient of a road surface. Thus, riding comfort of the human-powered vehicle is improved.

In accordance with a thirty-third aspect of the present disclosure, in the control device according to any one of the first to thirty-second aspects, the electronic controller is configured to control the transmission device as the human-powered vehicle stops so that the transmission ratio at which the vehicle is started becomes equal to the designated transmission ratio.

With the control device according to the thirty-third aspect, riding comfort of the human-powered vehicle is improved.

In accordance with a thirty-fourth aspect of the present disclosure, in the control device according to any one of the first to thirty-second aspects, the electronic controller is configured to control the transmission device as a crank of the human-powered vehicle rotates so that the transmission ratio at which the vehicle is started becomes equal to the designated transmission ratio.

With the control device according to the thirty-fourth aspect, riding comfort of the human-powered vehicle is improved.

In accordance with a thirty-fifth aspect of the present disclosure, the control device according to any one of the first to thirty-fourth aspects further comprises storage that stores information related to the designated transmission ratio in an updateable manner.

With the control device according to the thirty-fifth aspect, riding comfort of the human-powered vehicle is improved.

A transmission system in accordance with a thirty-sixth aspect of the present disclosure comprises the control device according to any one of the first to thirty-fifth aspects and the transmission device.

With the transmission system according to the thirty-sixth aspect, the designated transmission ratio specifying the transmission ratio at which the human-powered vehicle is started is set based on the reference information. This allows the rider riding the human-powered vehicle to stably start the human-powered vehicle. Thus, riding comfort of the human-powered vehicle is improved.

In accordance with a thirty-seventh aspect of the present disclosure, the transmission system according to the thirty-sixth aspect is configured so that the transmission device includes an external shifting device.

With the transmission system according to the thirty-seventh aspect, riding comfort of the human-powered vehicle is improved.

In accordance with a thirty-eighth aspect of the present disclosure, the transmission system according to the thirty-seventh aspect is configured so that the external shifting device includes a rear derailleur.

With the transmission system according to the thirty-eighth aspect, riding comfort of the human-powered vehicle is improved.

The control device and the transmission system according to the present disclosure improve riding comfort of the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
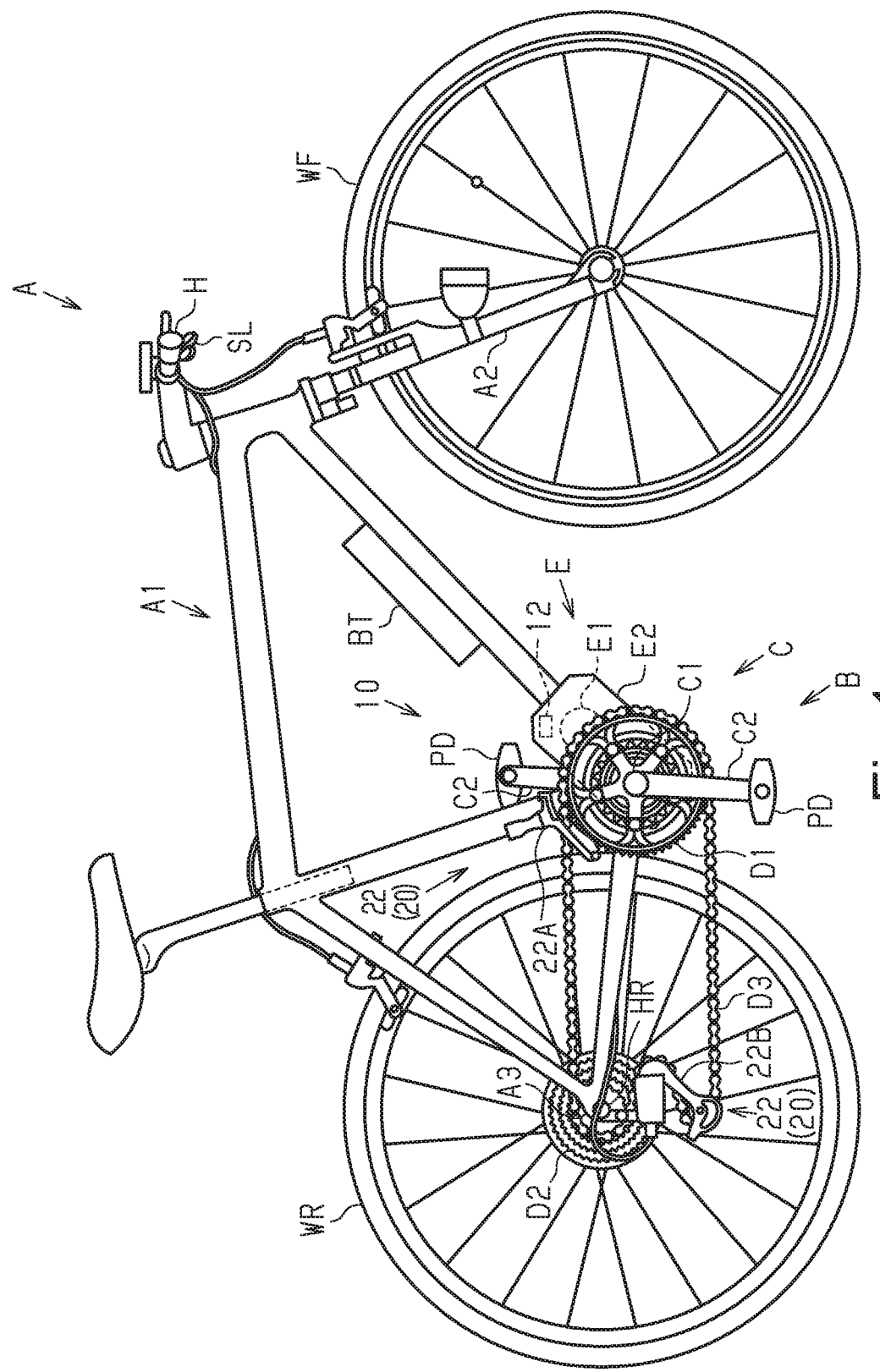
FIG. 1 is a side elevational view of a human-powered vehicle including a transmission system in accordance with a first embodiment.

A human-powered vehicle A including a transmission system 10 will now be described with reference to FIG. 1. The human-powered vehicle refers to a vehicle at least partially using human power as driving force for travelling and includes a vehicle electrically assisting human power. The human-powered vehicle does not include vehicles using only driving force that is not human power. In particular, a vehicle using only an internal combustion engine as driving force is not included in the human-powered vehicle. The human-powered vehicle is generally assumed to be a small, light vehicle that does not require a license for driving on a public road. The illustrated human-powered vehicle A is a bicycle including an electric assist unit E assisting propulsion of the human-powered vehicle A with electrical energy. More specifically, the illustrated human-powered vehicle A is a trekking bike. The human-powered vehicle A further includes a frame A1, a front fork A2, a front wheel WF, a rear wheel WR, a handlebar H, and a drivetrain B.

The drivetrain B is, for example, a chain-drive type. The drivetrain B includes a crank C, front sprockets D1, rear sprockets D2, and a chain D3. The crank C includes a crankshaft C1 rotatably supported by the frame A1 and a pair of crank arms C2 respectively provided on opposite ends of the crankshaft C1. A pedal PD is rotatably coupled to the distal end of each of the crank arms C2. The drivetrain B can be selected from any type and can be a belt-drive type or a shaft-drive type.

The front sprockets D1 are provided on the crank C to rotate integrally with the crankshaft C1. The rear sprockets D2 are provided on a hub HR of the rear wheel WR. The chain D3 runs around the front sprockets D1 and the rear sprockets D2. Human driving force applied to the pedals PD by the rider riding the human-powered vehicle A is transmitted via the front sprockets D1, the chain D3, and the rear sprockets D2 to the rear wheel WR.

The electric assist unit E is actuated to assist propulsion of the human-powered vehicle A. The electric assist unit E is actuated, for example, in accordance with human driving force applied to the pedals PD. The electrical assist unit E includes a motor E1. The electric assist unit E is actuated by electric power supplied from a battery BT mounted on the human-powered vehicle A.

The transmission system 10 includes a control device 12 and transmission devices 20. The control device 12 is accommodated, for example, in a housing E2 of the electric assist unit E. The control device 12 is actuated by electric power supplied from the battery BT. The transmission devices 20 include at least one external shifting device 22. The at least one external shifting device 22 includes a front derailleur 22A. The at least one external shifting device 22 includes a rear derailleur 22B. In an example, at least one of the front derailleur 22A and the rear derailleur 22B is mounted on the human-powered vehicle A. The front derailleur 22A is provided in the vicinity of the front sprockets D1. As the front derailleur 22A is driven, the front sprocket D1 on which the chain D3 runs is changed to change the transmission ratio of the human-powered vehicle A. The rear derailleur 22B is provided on a rear end A3 of the frame A1. As the rear derailleur TR is driven, the rear sprocket D2 on which the chain D3 runs is changed to change the transmission ratio of the human-powered vehicle A. In an example, the transmission devices 20 are mechanically or electrically driven in accordance with operation of respective shift levers SL. In a case in which the transmission devices 20 are electrically driven, the transmission devices 20 are actuated by electric power supplied from the battery BT or a dedicated power supply mounted on the transmission devices 20. The transmission devices 20 can include an internal shifting device instead of the external shifting device 22. In this case, the internal shifting device is provided, for example, on the hub HR of the rear wheel WR. The transmission devices 20 can include a stepless transmission device instead of the external shifting device 22. In this case, the stepless transmission device is provided, for example, on the hub HR of the rear wheel WR.

Figure 2:
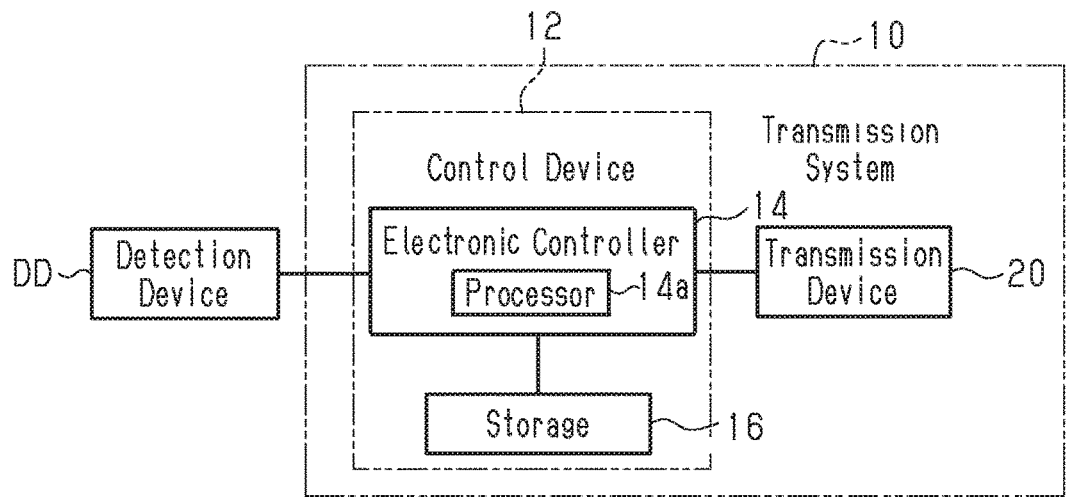
FIG. 2 is a block diagram of a transmission system and showing electrical connections between the control device shown in FIG. 1 and various components.

Specific configurations of the control device 12 will now be described with reference to FIG. 2. The control device 12 includes an electronic controller 14 that is configured to control the transmission devices 20 of the human-powered vehicle A. The electronic controller 14 is formed of one or more semiconductor chips that are mounted on a circuit board. The term "electronic controller" as used herein refers to hardware that executes a software program, and does not include a human. For simplicity, the electronic controller 14 will be hereinafter referred to as the controller 14. Here, the controller 14 controls transmission devices 20 so that a transmission ratio at which the human-powered vehicle A is started becomes equal to a designated transmission ratio GS. The controller 14 is a central processing unit (CPU) or a micro processing unit (MPU) that includes at least one processor 14a. In an example, the transmission ratio at which the human-powered vehicle A is started is a transmission ratio of the human-powered vehicle A at which the rider riding the human-powered vehicle A starts moving the pedals PD. In other words, the transmission ratio of the human-powered vehicle A is a transmission ratio of the human-powered vehicle A at which the crank C of the human-powered vehicle A starts rotating. In another example, the transmission ratio at which the human-powered vehicle A is started is a transmission ratio of the human-powered vehicle A at which the human-powered vehicle A starts traveling. The transmission device 20 that is controlled by the controller 14 is mainly the rear derailleur 22B. The controller 14 can further control various components installed on the human-powered vehicle A in addition to the transmission devices 20 of the human-powered vehicle A. The control device 12 further includes storage 16 that stores information related to the designated transmission ratio GS in an updatable manner. The storage 16 is any computer storage device or any non-transitory computer-readable medium with the sole exception of a transitory, propagating signal. For example, the storage 16 includes a nonvolatile memory and a volatile memory. The storage 16 stores, for example, various programs for control and predetermined information. The controller 14 can be one or more integrated circuits having firmware for causing the circuitry to complete the activities described herein. Of course, any number of other analog and/or digital components capable of performing the below described functionality can be provided in place of, or in conjunction with the described controller elements.

The controller 14 controls the transmission devices 20, for example, at one of a first example and a second example of time points described below. In the first example, the controller 14 controls the transmission devices 20 as the human-powered vehicle A stops so that the transmission ratio at which the human-powered vehicle A is started becomes equal to the designated transmission ratio GS. More specifically, at a time point in which the human-powered vehicle A is stopped, the controller 14 controls actuation of at least one of a movable member of the front derailleur 22A and a movable member of the rear derailleur 22B so that the transmission ratio at which the human-powered vehicle A is started becomes equal to the designated transmission ratio GS. In this case, at a time point in which human driving force is applied to the pedals PD, transmission of the transmission devices 20 is completed, and the transmission ratio at which the human-powered vehicle A is started becomes equal to the designated transmission ratio GS. In a case in which the transmission devices 20 include an internal shifting device, the controller 14 controls the transmission devices 20 at the time point corresponding to the first example.

In the second example, the controller 14 controls the transmission devices 20 as the crank C of the human-powered vehicle A is rotated so that the transmission ratio at which the human-powered vehicle A is started becomes equal to the designated transmission ratio GS. More specifically, at a time point in which the crank C of the human-powered vehicle A is rotated, the controller 14 controls actuation of at least one of the movable member of the front derailleur 22A and the movable member of the rear derailleur 22B so that the transmission ratio at which the human-powered vehicle A is started becomes equal to the designated transmission ratio GS. In this case, transmission of the transmission devices 20 is completed in accordance with the control described above, and the transmission ratio at which the human-powered vehicle A is started becomes equal to the designated transmission ratio GS.

The controller 14 sets the designated transmission ratio GS based on reference information that excludes information related to a gradient of a road surface, information related to manual operation of the transmission devices 20, and information related to propulsion assistance of the human-powered vehicle A. The information related to manual operation of the transmission devices 20 includes information related to operation of the shift levers SL. The information related to propulsion assistance of the human-powered vehicle A includes information related to a control mode of the electric assist unit E. The controller 14 stores information related to the set designated transmission ratio GS in the storage 16. In a case in which information related to the designated transmission ratio GS is stored in the storage 16, the controller 14 updates the information related to the designated transmission ratio GS stored in the storage 16 with information related to the newly set designated transmission ratio GS.

The controller 14 sets the designated transmission ratio GS, for example, so that the transmission ratio at which the human-powered vehicle A is started is included in a range that is greater than or equal to one and less than two. In a preferred example, the controller 14 sets the designated transmission ratio GS so that the transmission ratio at which the human-powered vehicle A is started is included in a range that is greater than or equal to 1.5 and less than two. In an example in which the designated transmission ratio GS is set to 1.79, the controller 14 controls actuation of at least one of the movable element of the front derailleur 22A and the movable element of the rear derailleur 22B so that the transmission ratio at which the human-powered vehicle A is started becomes 1.79.

The transmission ratio of the human-powered vehicle A is specified based on the relationship between number of teeth of the front sprockets D1 and the number of teeth of the rear sprockets D2. In an example, the transmission ratio of the human-powered vehicle A is defined by the ratio of rotation speed of the rear sprockets D2 to rotation speed of the front sprockets D1. More specifically, the transmission ratio of the human-powered vehicle A is defined by the ratio of the number of teeth of the front sprockets D1 to the number of teeth of the rear sprockets D2. The number of the front sprockets D1 is, for example, two. In an example, the front sprockets D1 include front sprockets D1 in which the number of teeth is 34T and 24T. The number of the rear sprockets D2 is, for example, eleven. In an example, the rear sprockets D2 include rear sprockets D2 in which the number of teeth is 46T, 37T, 32T, 28T, 24T, 21T, 19T, 17T, 15T, 13T, and 11T. In an example in which the designated transmission ratio GS is set to 1.79, the controller 14 controls the front derailleur 22A and the rear derailleur 22B so that the chain D3 runs on the front sprocket D1 in which the number of teeth is 34T and the rear sprocket D2 in which the number of teeth is 19T. In a case in which the chain D3 already runs on the front sprocket D1 in which the number of teeth is 34T, the controller 14 controls the rear derailleur 22B so that the chain D3 runs on the rear sprocket D2 in which the number of teeth is 19T. After the designated transmission ratio GS is set to 1.79, in a case in which the designated transmission ratio GS is set to 1.62 based on the reference information, the controller 14 updates information related to the designated transmission ratio GS (for example, 1.79) stored in the storage 16 with information related to the newly set designated transmission ratio GS (for example, 1.62).

The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes vehicle stop information related to a stopping state of the human-powered vehicle A. The vehicle stop information includes information related to a transmission ratio at which the human-powered vehicle A is stopped. In an example, the transmission ratio at which the human-powered vehicle A is stopped is a transmission ratio of the human-powered vehicle A at which the human-powered vehicle A was stopped. In an example, the transmission ratio at which the human-powered vehicle A is stopped is a transmission ratio of the human-powered vehicle a short time before the human-powered vehicle A is stopped.

In a case in which the transmission ratio at which the human-powered vehicle A is stopped is greater than or equal to the designated transmission ratio GS, the controller 14 maintains the designated transmission ratio GS. More specifically, in a case in which the transmission ratio at which the human-powered vehicle A is stopped is greater than or equal to the designated transmission ratio GS stored in the storage 16, the controller 14 does not update and maintains the designated transmission ratio GS stored in the storage 16. In a case in which the transmission ratio at which the human-powered vehicle A is stopped is greater than or equal to the designated transmission ratio GS, the controller 14 can set the designated transmission ratio GS so that the transmission ratio at which the human-powered vehicle A is started is increased. In other words, in a case in which the transmission ratio at which the human-powered vehicle A is stopped is greater than or equal to the designated transmission ratio GS, the controller 14 can set the designated transmission ratio GS to be greater than the designated transmission ratio GS stored in the storage 16. In this example, in a case in which the transmission ratio at which the human-powered vehicle A is stopped is a maximum transmission ratio, the controller 14 maintains the designated transmission ratio GS. The maximum transmission ratio of the human-powered vehicle A is the maximum transmission ratio specified based on the relationship between the front sprockets D1 and the rear sprockets D2. In a case in which the transmission ratio at which the human-powered vehicle A is stopped is greater than or equal to the designated transmission ratio GS, the controller 14 can set the transmission ratio at which the human-powered vehicle A is stopped as the designated transmission ratio GS.

In a case in which the transmission ratio at which the human-powered vehicle A is stopped is less than the designated transmission ratio GS, the controller 14 sets the designated transmission ratio GS so that the transmission ratio at which the human-powered vehicle A is started is decreased. In other words, in a case in which the transmission ratio at which the human-powered vehicle A is stopped is less than the designated transmission ratio GS, the controller 14 sets the designated transmission ratio GS to be less than the designated transmission ratio GS stored in the storage 16. In the present embodiment, in a case in which the transmission ratio at which the human-powered vehicle A is stopped is less than the designated transmission ratio GS, the controller 14 sets the transmission ratio at which the human-powered vehicle A is stopped as the designated transmission ratio GS. More specifically, in a case in which the transmission ratio at which the human-powered vehicle A is stopped is less than the designated transmission ratio GS stored in the storage 16, the controller 14 updates the designated transmission ratio GS stored in the storage 16 with the transmission ratio at which the human-powered vehicle A is stopped. In a case in which the transmission ratio at which the human-powered vehicle A is stopped is less than the designated transmission ratio GS, the controller 14 can maintain the designated transmission ratio GS.

The human-powered vehicle A further includes a detection device DD that detects the reference information. In the present embodiment, the detection device DD is configured to detect a transmission ratio at which the human-powered vehicle A is stopped. The detection device DD includes, for example, various sensors configured to detect the transmission ratio of the human-powered vehicle A. In an example, the detection device DD is provided on the transmission devices 20. The detection device DD sends, for example, various kinds of detected information to the controller 14.

Figure 3:
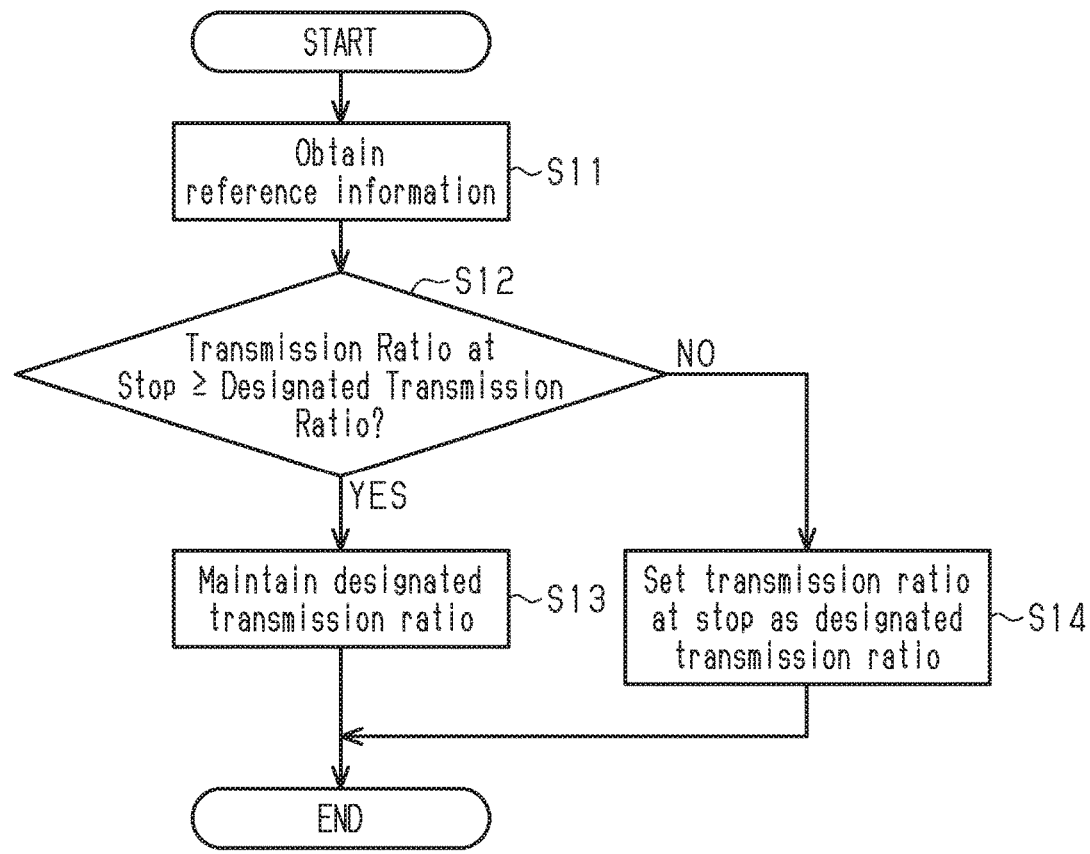
FIG. 3 is a flowchart showing an example of a control executed by an electronic controller of the control device shown in FIG. 1.

An example of a control executed by the processor 14a of the control device 12 will now be described with reference to FIG. 3.

In step S11, the controller 14 obtains the reference information. More specifically, the controller 14 obtains information related to the transmission ratio at which the human-powered vehicle A is stopped from the detection device DD. In step S12, the controller 14 determines whether or not the transmission ratio at which the human-powered vehicle A is stopped is greater than or equal to the designated transmission ratio GS. In a case in which it is determined in step S12 that the transmission ratio at which the human-powered vehicle A is stopped is greater than or equal to the designated transmission ratio GS, the controller 14 proceeds to step S13. In step S13, the controller 14 maintains the designated transmission ratio GS stored in the storage 16.

In a case in which it is determined in step S12 that the transmission ratio at which the human-powered vehicle A is stopped is less than the designated transmission ratio GS, the controller 14 proceeds to step S14. In step S14, the controller 14 sets the transmission ratio at which the human-powered vehicle A is stopped as the designated transmission ratio GS. The above-described process completes steps S11 to S14. For example, in a state in which electric power is supplied from the battery BT, the controller 14 repeats steps S11 to S14.

Second Embodiment

Figure 4:
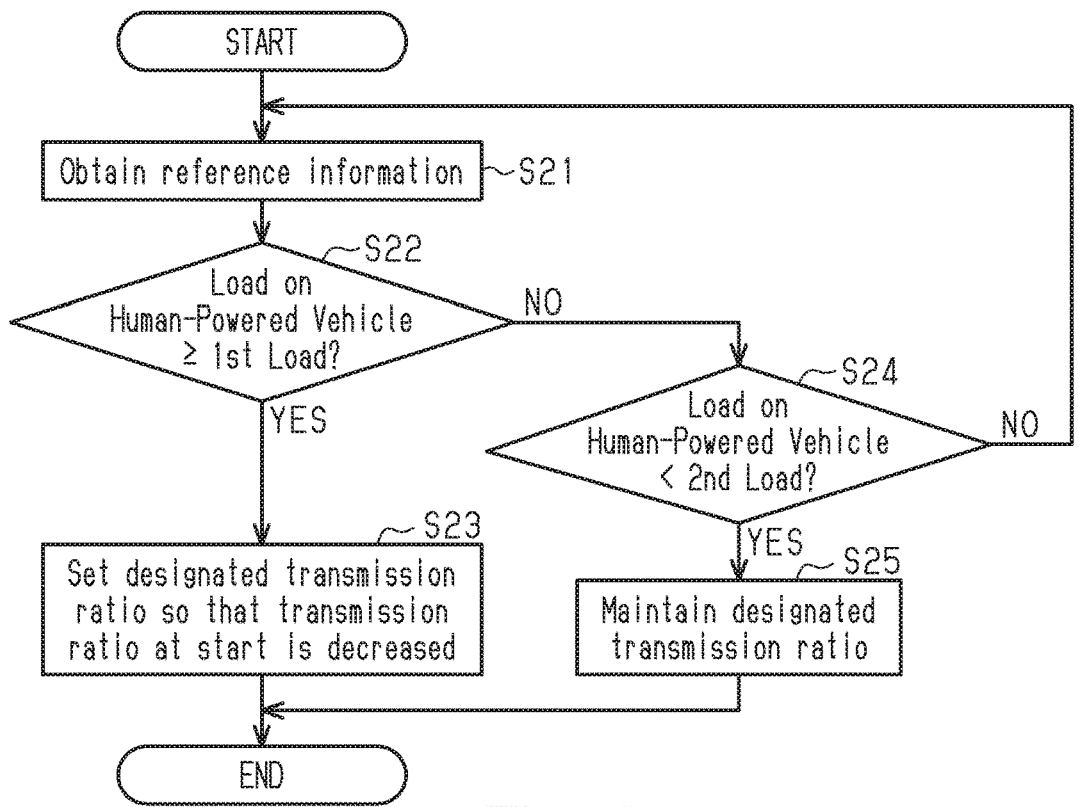
FIG. 4 is a flowchart showing an example of a control executed by the electronic controller of the control device in accordance with a second embodiment.

A second embodiment of a control for the transmission system 10 will now be described with reference to FIG. 4. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes riding information related to riding of the human-powered vehicle A. The riding information includes information related to a load on the human-powered vehicle A. The load on the human-powered vehicle A includes at least one of cadence, torque acting on the crank C of the human-powered vehicle A, and power. Power is a product of cadence and torque. The load on the human-powered vehicle A used for setting the designated transmission ratio GS can be an average load on the human-powered vehicle A from a start to a stop of the human-powered vehicle A or can be a load on the human-powered vehicle A occurring a short time before the human-powered vehicle A is stopped. In the present embodiment, the detection device DD is configured to detect a load on the human-powered vehicle A. The detection device DD includes, for example, various sensors configured to detect a load on the human-powered vehicle A. In an example, the detection device DD is provided on the crank C of the human-powered vehicle A.

In a case in which the load on the human-powered vehicle A is greater than or equal to a first load, the controller 14 sets the designated transmission ratio GS so that the transmission ratio at which the human-powered vehicle A is started is decreased. In other words, in a case in which the load on the human-powered vehicle A is greater than or equal to the first load, the controller 14 sets the designated transmission ratio GS to be less than the designated transmission ratio GS stored in the storage 16. In a case in which the designated transmission ratio GS stored in the storage 16 is a minimum transmission ratio, the controller 14 maintains the designated transmission ratio GS. The minimum transmission ratio of the human-powered vehicle A is the minimum transmission ratio specified based on the relationship between the front sprockets D1 and the rear sprockets D2.

In a case in which the load on the human-powered vehicle A is less than a second load, the controller 14 sets the designated transmission ratio GS so that the transmission ratio at which the human-powered vehicle A is started is increased or maintains the designated transmission ratio GS. In the present embodiment, in a case in which the load on the human-powered vehicle A is less than the second load, the controller 14 maintains the designated transmission ratio GS. In other words, in a case in which the load on the human-powered vehicle A is less than the second load, the controller 14 does not update and maintains the designated transmission ratio GS stored in the storage 16. The second load can be equal to the first load or can differ from the first load. In a case in which the first load differs from the second load, the second load is less than the first load.

In a case in which the load on the human-powered vehicle A is greater than or equal to the first load, the controller 14 can set the designated transmission ratio GS so that the transmission ratio at which the human-powered vehicle A is started is increased or can maintain the designated transmission ratio GS. In a case in which the load on the human-powered vehicle A is less than the second load, the controller 14 can set the designated transmission ratio GS so that the transmission ratio at which the human-powered vehicle A is started is decreased.

An example of a control executed by the processor 14a of the control device 12 will now be described with reference to FIG. 4.

In step S21, the controller 14 obtains the reference information. More specifically, the controller 14 obtains information related to a load on the human-powered vehicle A from the detection device DD. In step S22, the controller 14 determines whether or not the load on the human-powered vehicle A is greater than or equal to the first load. In a case in which it is determined in step S22 that the load on the human-powered vehicle A is greater than or equal to the first load, the controller 14 proceeds to step S23. In step S23, the controller 14 sets the designated transmission ratio GS so that the transmission ratio at which the human-powered vehicle A is started is decreased.

In a case in which it is determined in step S22 that the load on the human-powered vehicle A is less than the first load, the controller 14 proceeds to step S24. In step S24, the controller 14 determines whether or not the load on the human-powered vehicle A is less than the second load. In a case in which it is determined in step S24 that the load on the human-powered vehicle A is greater than or equal to the second load, the controller 14 returns to step S21. In a case in which it is determined in step S24 that the load on the human-powered vehicle A is less than the second load, the controller 14 proceeds to step S25. In step S25, the controller 14 maintains the designated transmission ratio GS stored in the storage 16. The above-described process completes steps S21 to S25. For example, in a state in which electric power is supplied from the battery BT, the controller 14 repeats steps S21 to S25. In a case in which the first load is equal to the second load, step S24 can be omitted from the control executed by the control device 12.

Third Embodiment

Figure 5:
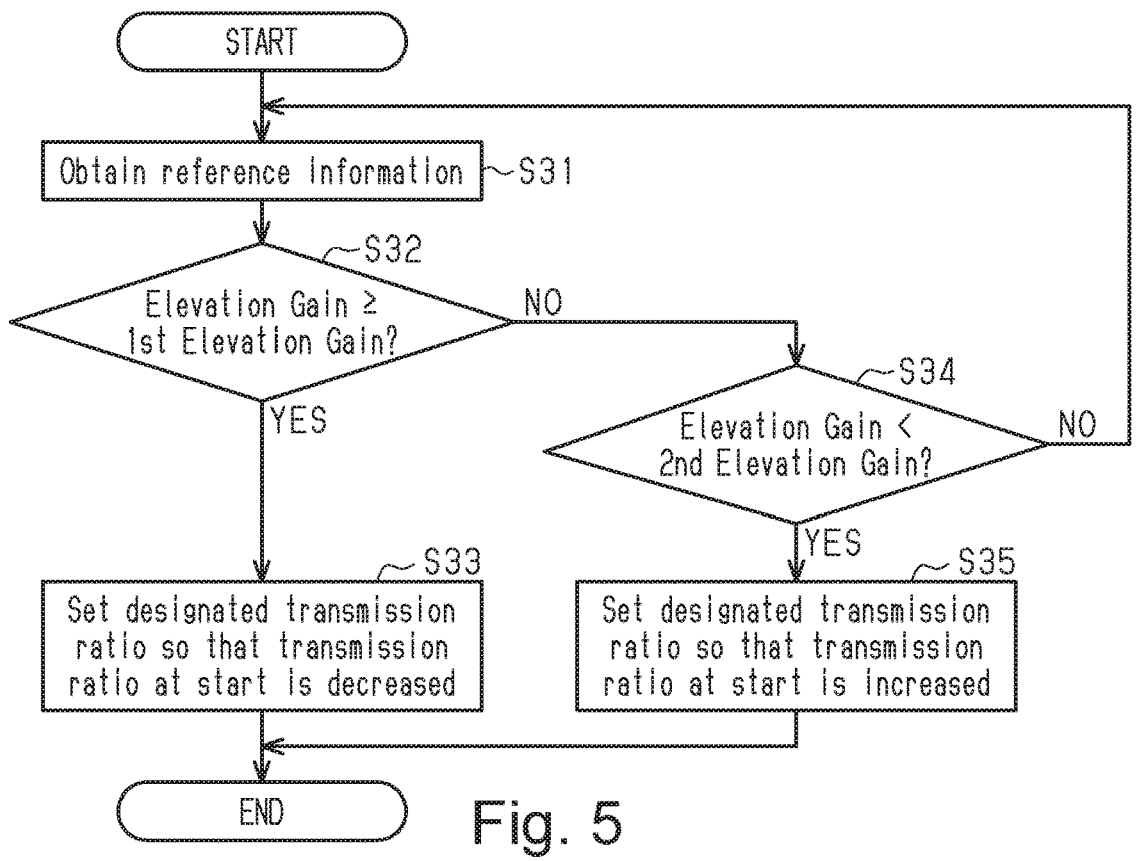
FIG. 5 is a flowchart showing an example of a control executed by a third embodiment of a control device in accordance with a third embodiment.

A third embodiment of a control for the transmission system 10 will now be described with reference to FIG. 5. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes riding information related to riding of the human-powered vehicle A. The riding information includes an elevation gain of the human-powered vehicle A. The elevation gain of the human-powered vehicle A can be specified by the difference in altitude between the start point and the highest point of the route on which the rider has ridden the human-powered vehicle A or can be specified by an accumulation of differences in altitude related to uphill slopes on which the rider has ridden the human-powered vehicle A. In the present embodiment, the detection device DD is configured to detect an elevation gain of the human-powered vehicle A. The detection device DD includes, for example, various sensors configured to detect an elevation gain of the human-powered vehicle A. In an example, the detection device DD is provided on, for example, the frame A1 of the human-powered vehicle A.

In a case in which the elevation gain of the human-powered vehicle A is greater than or equal to a first elevation gain, the controller 14 sets the designated transmission ratio GS so that the transmission ratio at which the human-powered vehicle A is started is decreased. In other words, in a case in which the elevation gain of the human-powered vehicle A is greater than or equal to the first elevation gain, the controller 14 sets the designated transmission ratio GS to be less than the designated transmission ratio GS stored in the storage 16. In a case in which the elevation gain of the human-powered vehicle A is greater than or equal to a third elevation gain that is greater than the first elevation gain, the controller 14 can set the designated transmission ratio GS so that the transmission ratio at which the human-powered vehicle A is started is further decreased. In a case in which the designated transmission ratio GS stored in the storage 16 is the minimum transmission ratio, the controller 14 maintains the designated transmission ratio GS.

In a case in which the elevation gain of the human-powered vehicle A is less than a second elevation gain, the controller 14 sets the designated transmission ratio GS so that the transmission ratio at which the human-powered vehicle A is started is increased or maintains the designated transmission ratio GS. In the present embodiment, in a case in which the elevation gain of the human-powered vehicle A is less than the second elevation gain, the controller 14 sets the designated transmission ratio GS so that the transmission ratio at which the human-powered vehicle A is started is increased. In other words, in a case in which the elevation gain of the human-powered vehicle A is less than the second elevation gain, the controller 14 sets the designated transmission ratio GS to be greater than the designated transmission ratio GS stored in the storage 16. In a case in which the designated transmission ratio GS stored in the storage 16 is the maximum transmission ratio, the controller 14 maintains the designated transmission ratio GS. The second elevation gain can be equal to the first elevation gain or can differ from the first elevation gain. In a case in which the first elevation gain differs from the second elevation gain, the second elevation gain is smaller than the first elevation gain.

In a case in which the elevation gain of the human-powered vehicle A is greater than or equal to the first elevation gain, the controller 14 can set the designated transmission ratio GS so that the transmission ratio at which the human-powered vehicle A is started is increased or can maintain the designated transmission ratio GS. In a case in which the elevation gain of the human-powered vehicle A is less than the second elevation gain, the controller 14 can set the designated transmission ratio GS so that the transmission ratio at which the human-powered vehicle A is started is decreased.

An example of a control executed by the processor 14*a* of the control device 12 will now be described with reference to FIG. 5.

In step S31, the controller 14 obtains the reference information. More specifically, the controller 14 obtains information related to an elevation gain of the human-powered vehicle A from the detection device DD. In step S32, the controller 14 determines whether or not the elevation gain of the human-powered vehicle A is greater than or equal to the first elevation gain. In a case in which it is determined in step S32 that the elevation gain of the human-powered vehicle A is greater than or equal to the first elevation gain, the controller 14 proceeds to step S33. In step S33, the controller 14 sets the designated transmission ratio GS so that the transmission ratio at which the human-powered vehicle A is started is decreased.

In a case in which it is determined in step S32 that the elevation gain of the human-powered vehicle A is less than the first elevation gain, the controller 14 proceeds to step S34. In step S34, the controller 14 determines whether or not the elevation gain of the human-powered vehicle A is less than the second elevation gain. In a case in which it is determined in step S34 that the elevation gain of the human-powered vehicle A is greater than or equal to the second elevation gain, the controller 14 returns to step S31. In a case in which it is determined in step S34 that the elevation gain of the human-powered vehicle A is less than the second elevation gain, the controller 14 proceeds to step S35. In step S35, the controller 14 sets the designated transmission ratio GS so that the transmission ratio at which the human-powered vehicle A is started is increased. The above-described process completes steps S31 to S35. For example, in a state in which electric power is supplied from the battery BT, the controller 14 repeats steps S31 to S35. In a case in which the first elevation gain is equal to the second elevation gain, step S34 can be omitted from the control executed by the control device 12.

Fourth Embodiment

Figure 6:
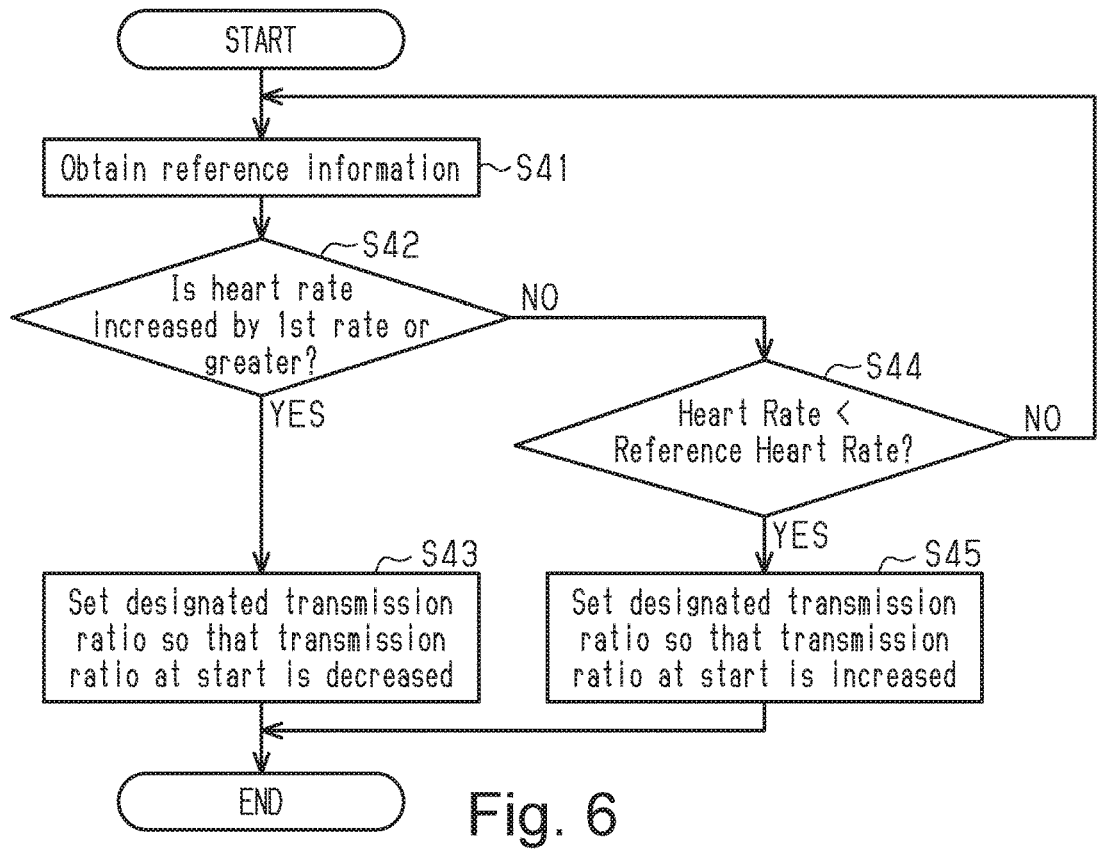
FIG. 6 is a flowchart showing an example of a control executed by the electronic controller of the control device in accordance with a fourth embodiment.

A fourth embodiment of a control for the transmission system 10 will now be described with reference to FIG. 6. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes rider information related to the rider riding the human-powered vehicle A. The rider information includes fatigue information related to fatigue of the rider. The fatigue information includes information related to a change in biological information. In the present embodiment, the biological information includes information related to a heart rate of the rider. The heart rate of the rider used for setting the designated transmission ratio GS can be an average heart rate from a start to a stop of the human-powered vehicle A or can be a heart rate a short time before the human-powered vehicle A is stopped. The biological information can include at least one of information related to a perspiration amount of the rider, information related to a muscle potential of the rider, and information related to the body temperature of the rider instead of or in addition to the information related to a heart rate of the rider. In the present embodiment, the detection device DD is configured to detect biological information of the rider. The detection device DD includes, for example, various sensors configured to detect biological information of the rider. The detection device DD can be attached to the rider riding the human-powered vehicle A or can be provided on a grip of the handlebar H.

In a case in which the heart rate of the rider is increased by a first rate or greater, the controller 14 sets the designated transmission ratio GS so that the transmission ratio at which the human-powered vehicle A is started is decreased. In other words, in a case in which the heart rate of the rider is increased by the first rate or greater, the controller 14 sets the designated transmission ratio GS to be less than the designated transmission ratio GS stored in the storage 16. In a case in which the designated transmission ratio GS stored in the storage 16 is the minimum transmission ratio, the controller 14 maintains the designated transmission ratio GS. The first rate is, for example, 20%. In the present embodiment, in a case in which the heart rate of the rider is increased from a reference heart rate by the first rate or greater, the controller 14 sets the designated transmission ratio GS so that the transmission ratio at which the human-powered vehicle A is started is decreased. The reference heart rate is appropriately set, for example, in accordance with the heart rate of the rider before the human-powered vehicle A is started.

In a case in which the heart rate of the rider is less than the reference heart rate, the controller 14 sets the designated transmission ratio GS so that the transmission ratio at which the human-powered vehicle A is started is increased or maintains the designated transmission ratio GS. In the present embodiment, in a case in which the heart rate of the rider is less than the reference heart rate, the controller 14 sets the designated transmission ratio GS so that the transmission ratio at which the human-powered vehicle A is started is increased. In other words, in a case in which the heart rate of the rider is less than the reference heart rate, the controller 14 sets the designated transmission ratio GS to be greater than the designated transmission ratio GS stored in the storage 16. In a case in which the designated transmission ratio GS stored in the storage 16 is the maximum transmission ratio, the controller 14 maintains the designated transmission ratio GS.

In a case in which the heart rate of the rider is increased by the first rate or greater, the controller 14 can set the designated transmission ratio GS so that the transmission ratio at which the human-powered vehicle A is started is increased. In a case in which the heart rate of the rider is less than the reference heart rate, the controller 14 can set the designated transmission ratio GS so that the transmission ratio at which the human-powered vehicle A is started is decreased or can maintain the designated transmission ratio GS.

An example of a control executed by the processor 14a of the control device 12 will now be described with reference to FIG. 6.

In step S41, the controller 14 obtains the reference information. More specifically, the controller 14 obtains information related to a heart rate of the rider from the detection device DD. In step S42, the controller 14 determines whether or not the heart rate of the rider is increased by the first rate or greater. In a case in which it is determined in step S42 that the heart rate of the rider is increased by the first rate or greater, the controller 14 proceeds to step S43. In step S43, the controller 14 sets the designated transmission ratio GS so that the transmission ratio at which the human-powered vehicle A is started is decreased.

In a case in which it is determined in step S42 that the heart rate of the rider is not increased by the first rate or greater, the controller 14 proceeds to step S44. In step S44, the controller 14 determines whether or not the heart rate of the rider is less than the reference heart rate. In a case in which it is determined in step S44 that the heart rate of the rider is greater than or equal to the reference heart rate, the controller 14 returns to step S41. In a case in which it is determined in step S44 that the heart rate of the rider is less than the reference heart rate, the controller 14 proceeds to step S45. In step S45, the controller 14 sets the designated transmission ratio GS so that the transmission ratio at which the human-powered vehicle A is started is increased. The above-described process completes steps S41 to S45. For example, in a state in which electric power is supplied from the battery BT, the controller 14 repeats steps S41 to S45.

Fifth Embodiment

Figure 7:
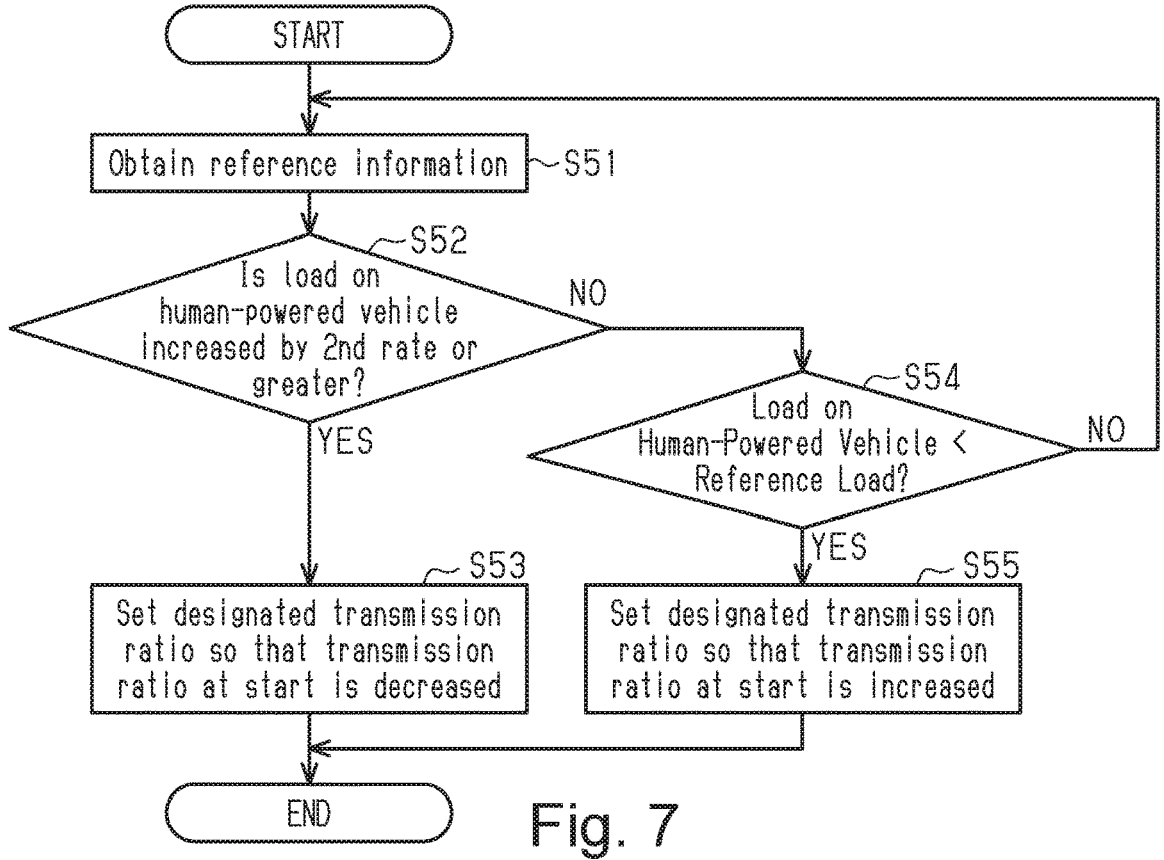
FIG. 7 is a flowchart showing an example of a control executed by the electronic controller of the control device in accordance with a fifth embodiment.

A fifth embodiment of a control for the transmission system 10 will now be described with reference to FIG. 7. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes rider information related to the rider riding the human-powered vehicle A. The rider information includes fatigue information related to fatigue of the rider. The fatigue information includes information related to a change in a load on the human-powered vehicle A. The load on the human-powered vehicle A includes at least one of cadence, torque acting on the crank C of the human-powered vehicle A, and power. Power is a product of cadence and torque. The load on the human-powered vehicle A used for setting the designated transmission ratio GS can be an average load on the human-powered vehicle A from a start to a stop of the human-powered vehicle A or can be a load on the human-powered vehicle A occurring a short time before the human-powered vehicle A is stopped. In the present embodiment, the detection device DD is configured to detect a load on the human-powered vehicle A. The detection device DD includes, for example, various sensors configured to detect a load on the human-powered vehicle A. In an example, the detection device DD is provided on the crank C of the human-powered vehicle A.

In a case in which the load on the human-powered vehicle A is increased by a second rate or greater, the controller 14 sets the designated transmission ratio GS so that the transmission ratio at which the human-powered vehicle A is started is decreased. In other words, in a case in which the load on the human-powered vehicle A is increased by the second rate or greater, the controller 14 sets the designated transmission ratio GS to be less than the designated transmission ratio GS stored in the storage 16. In a case in which the designated transmission ratio GS stored in the storage 16 is the minimum transmission ratio, the controller 14 maintains the designated transmission ratio GS. The second rate is, for example, 20%. In the present embodiment, in a case in which the load on the human-powered vehicle A is increased from a reference load by the second rate or greater, the controller 14 sets the designated transmission ratio GS so that the transmission ratio at which the human-powered vehicle A is started is decreased. The reference load is approximately set, for example, in accordance with the load on the human-powered vehicle A at a time in which the rider starts riding the human-powered vehicle A.

In a case in which the load on the human-powered vehicle A is less than the reference load, the controller 14 sets the designated transmission ratio GS so that the transmission ratio at which the human-powered vehicle A is started is increased or maintains the designated transmission ratio GS. In the present embodiment, in a case in which the load on the human-powered vehicle A is less than the reference load, the controller 14 sets the designated transmission ratio GS so that the transmission ratio at which the human-powered vehicle A is started is increased. In other words, in a case in which the load on the human-powered vehicle A is less than the reference load, the controller 14 sets the designated transmission ratio GS to be greater than the designated transmission ratio GS stored in the storage 16. In a case in which the designated transmission ratio GS stored in the storage 16 is the maximum transmission ratio, the controller 14 maintains the designated transmission ratio GS.

In a case in which the load on the human-powered vehicle A is increased by the second rate or greater, the controller 14 can set the designated transmission ratio GS so that the transmission ratio at which the human-powered vehicle A is started is increased. In a case in which the load on the human-powered vehicle A is less than the reference load, the controller 14 can set the designated transmission ratio GS so that the transmission ratio at which the human-powered vehicle A is started is decreased or can maintain the designated transmission ratio GS.

An example of a control executed by the processor 14a of the control device 12 will now be described with reference to FIG. 7.

In step S51, the controller 14 obtains the reference information. More specifically, the controller 14 obtains information related to the load on the human-powered vehicle A from the detection device DD. In step S52, the controller 14 determines whether or not the load on the human-powered vehicle A is increased by the second rate or greater. In a case in which it is determined in step S52 that the load on the human-powered vehicle A is increased by the second rate or greater, the controller 14 proceeds to step S53. In step S53, the controller 14 sets the designated transmission ratio GS so that the transmission ratio at which the human-powered vehicle A is started is decreased.

In a case in which it is determined in step S52 that the load on the human-powered vehicle A is not increased by the second rate or greater, the controller 14 proceeds to step S54. In step S54, the controller 14 determines whether or not the load on the human-powered vehicle A is less than the reference load. In a case in which it is determined in step S54 that the load on the human-powered vehicle A is greater than or equal to the reference load, the controller 14 returns to step S51. In a case in which it is determined in step S54 that the load on the human-powered vehicle A is less than the reference load, the controller 14 proceeds to step S55. In step S55, the controller 14 sets the designated transmission ratio GS so that the transmission ratio at which the human-powered vehicle A is started is increased. The above-described process completes steps S51 to S55. For example, in a state in which electric power is supplied from the battery BT, the controller 14 repeats steps S51 to S55.

Sixth Embodiment

Figure 8:
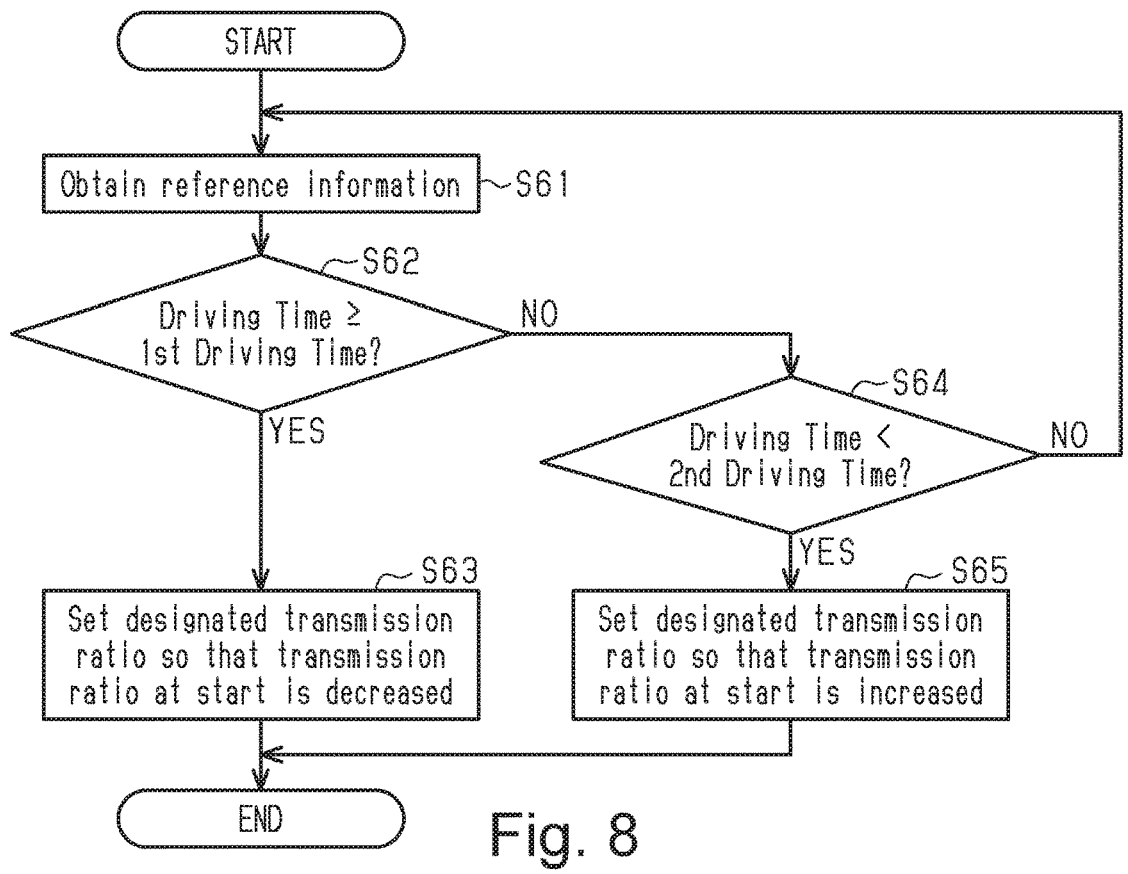
FIG. 8 is a flowchart showing an example of a control executed the electronic controller of the control device in accordance with a sixth embodiment.

A sixth embodiment of a control for the transmission system 10 will now be described with reference to FIG. 8. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes rider information related to the rider riding the human-powered vehicle A. The rider information includes fatigue information related to fatigue of the rider. The fatigue information includes information related to a driving time. The driving time used for setting the designated transmission ratio GS is, for example, an accumulated time in which the rider has ridden the human-powered vehicle A. In the present embodiment, the detection device DD is configured to detect a driving time. The detection device DD includes, for example, various sensors configured to detect a driving time. In an example, the detection device DD is provided on a cycle computer mounted on the human-powered vehicle A.

In a case in which the driving time is longer than or equal to a first driving time, the controller 14 sets the designated transmission ratio GS so that the transmission ratio at which the human-powered vehicle A is started is decreased. In other words, in a case in which the driving time is longer than or equal to the first driving time, the controller 14 sets the designated transmission ratio GS to be less than the designated transmission ratio GS stored in the storage 16. In a case in which the driving time is longer than or equal to a third driving time that is longer than the first driving time, the controller 14 can set the designated transmission ratio GS so that the transmission ratio at which the human-powered vehicle A is started is further decreased. In a case in which the designated transmission ratio GS stored in the storage 16 is the minimum transmission ratio, the controller 14 maintains the designated transmission ratio GS.

In a case in which the driving time is shorter than a second driving time, the controller 14 sets the designated transmission ratio GS so that the transmission ratio at which the human-powered vehicle A is started is increased or maintains the designated transmission ratio GS. In the present embodiment, in a case in which the driving time is shorter than the second driving time, the controller 14 sets the designated transmission ratio GS so that the transmission ratio at which the human-powered vehicle A is started is increased. In other words, in a case in which the driving time is shorter than the second driving time, the controller 14 sets the designated transmission ratio GS to be greater than the designated transmission ratio GS stored in the storage 16. In a case in which the designated transmission ratio GS stored in the storage 16 is the maximum transmission ratio, the controller 14 maintains the designated transmission ratio GS. The second driving time can be equal to the first driving time or can differ from the first driving time. In a case in which the first driving time differs from the second driving time, the second driving time is shorter than the first driving time.

In a case in which the driving time is longer than or equal to the first driving time, the controller 14 can set the designated transmission ratio GS so that the transmission ratio at which the human-powered vehicle A is started is increased or can maintain the designated transmission ratio GS. In a case in which the driving time is shorter than the second driving time, the controller 14 can set the designated transmission ratio GS so that the transmission ratio at which the human-powered vehicle A is started is decreased.

An example of a control executed by the processor 14a of the control device 12 will now be described with reference to FIG. 8.

In step S61, the controller 14 obtains the reference information. More specifically, the controller 14 obtains information related to the driving time from the detection device DD. In step S62, the controller 14 determines whether or not the driving time is longer than or equal to the first driving time. In a case in which it is determined in step S62 that the driving time is longer than or equal to the first driving time, the controller 14 proceeds to step S63. In step S63, the controller 14 sets the designated transmission ratio GS so that the transmission ratio at which the human-powered vehicle A is started is decreased.

In a case in which it is determined in step S62 that the driving time is shorter than the first driving time, the controller 14 proceeds to step S64. In step S64, the controller 14 determines whether or not the driving time is shorter than the second driving time. In a case in which it is determined in step S64 that the driving time is longer than or equal to the second driving time, the controller 14 returns to step S61. In a case in which it is determined in step S64 that the driving time is shorter than the second driving time, the controller 14 proceeds to step S65. In step S65, the controller 14 sets the designated transmission ratio GS so that the transmission ratio at which the human-powered vehicle A is started is increased. The above-described process completes steps S61 to S65. For example, in a state in which electric power is supplied from the battery BT, the controller 14 repeats steps S61 to S65. In a case in which the first driving time is equal to the second driving time, step S64 can be omitted from the control executed by the control device 12.

Seventh Embodiment

Figure 9:
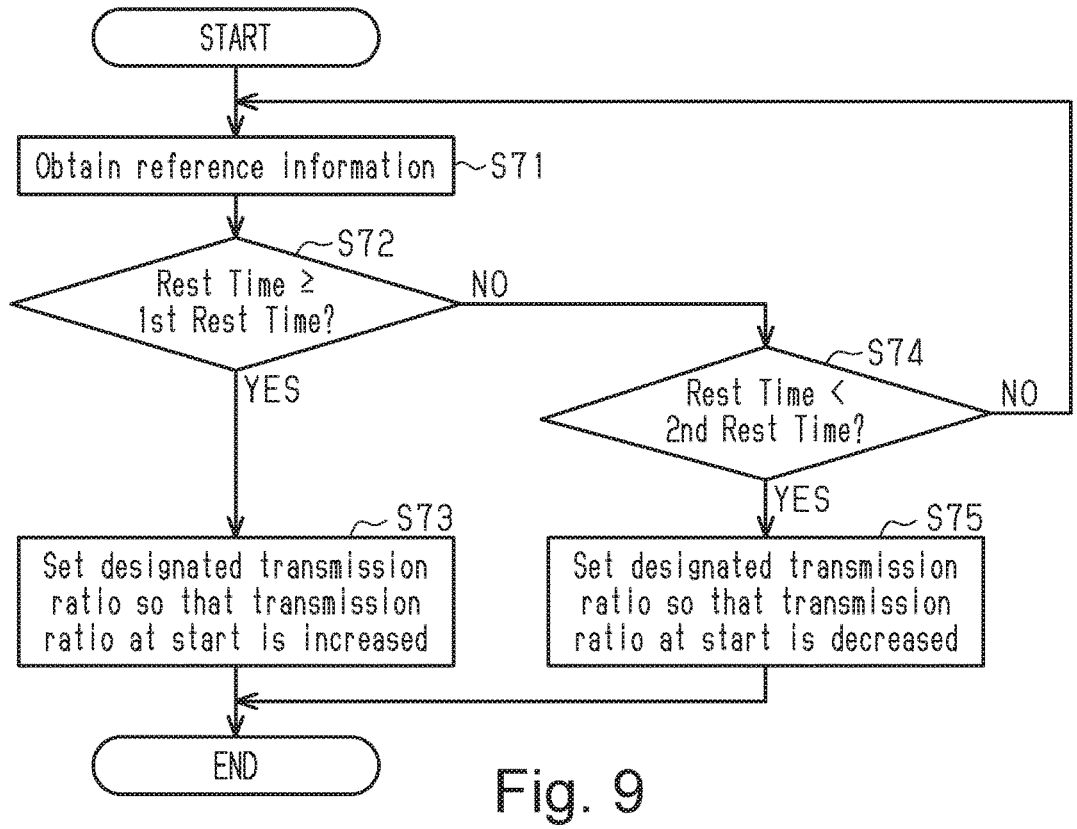
FIG. 9 is a flowchart showing an example of a control executed by the electronic controller of the control device in accordance with a seventh embodiment.

A seventh embodiment of a control for the transmission system 10 will now be described with reference to FIG. 9. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes rider information related to the rider riding the human-powered vehicle A. The rider information includes fatigue information related to fatigue of the rider. The fatigue information includes information related to a rest time. The rest time used for setting the designated transmission ratio GS is, for example, a rest time a short time before the human-powered vehicle A is started. The rest time is, for example, from a time at which the rider stops riding the human-powered vehicle A to a time at which the rider resumes riding. More specifically, the rest time is a time taken from a time at which the rider gets off the human-powered vehicle A to a time at which the rider again rides the human-powered vehicle A. In the present embodiment, the detection device DD is configured to detect a rest time. The detection device DD includes, for example, various sensors configured to detect a rest time. In an example, the detection device DD is provided on a cycle computer mounted on the human-powered vehicle A.

In a case in which the rest time is longer than or equal to a first rest time, the controller 14 sets the designated transmission ratio GS so that the transmission ratio at which the human-powered vehicle A is started is increased or maintains the designated transmission ratio GS. In the present embodiment, in a case in which the rest time is longer than or equal to the first rest time, the controller 14 sets the designated transmission ratio GS so that the transmission ratio at which the human-powered vehicle A is started is increased. In other words, in a case in which the rest time is longer than or equal to the first rest time, the controller 14 sets the designated transmission ratio GS to be greater than the designated transmission ratio GS stored in the storage 16. In a case in which the rest time is longer than or equal to a third rest time that is longer than the first rest time, the controller 14 can set the designated transmission ratio GS so that the transmission ratio at which the human-powered vehicle A is started is further increased. In a case in which the designated transmission ratio GS stored in the storage 16 is the maximum transmission ratio, the controller 14 maintains the designated transmission ratio GS.

In a case in which the rest time is shorter than a second rest time, the controller 14 sets the designated transmission ratio GS so that the transmission ratio at which the human-powered vehicle A is started is decreased. In other words, in a case in which the rest time is shorter than the second rest time, the controller 14 sets the designated transmission ratio GS to be less than the designated transmission ratio GS stored in the storage 16. In a case in which the designated transmission ratio GS stored in the storage 16 is the minimum transmission ratio, the controller 14 maintains the designated transmission ratio GS. The second rest time can be equal to the first rest time or can differ from the first rest time. In a case in which the first rest time differs from the second rest time, the second rest time is shorter than the first rest time.

In a case in which the rest time is longer than or equal to the first rest time, the controller 14 can set the designated transmission ratio GS so that the transmission ratio at which the human-powered vehicle A is started is decreased. In a case in which the rest time is shorter than the second rest time, the controller 14 can set the designated transmission ratio GS so that the transmission ratio at which the human-powered vehicle A is started is increased or can maintain the designated transmission ratio GS.

An example of a control executed by the processor 14a of the control device 12 will now be described with reference to FIG. 9.

In step S71, the controller 14 obtains the reference information. More specifically, the controller 14 obtains information related to the rest time from the detection device DD. In step S72, the controller 14 determines whether or not the rest time is longer than or equal to the first rest time. In a case in which it is determined in step S72 that the rest time is longer than or equal to the first rest time, the controller 14 proceeds to step S73. In step S73, the controller 14 sets the designated transmission ratio GS so that the transmission ratio at which the human-powered vehicle A is started is increased.

In a case in which it is determined in step S72 that the rest time is shorter than the first rest time, the controller 14 proceeds to step S74. In step S74, the controller 14 determines whether or not the rest time is shorter than the second rest time. In a case in which it is determined that in step S74 that the rest time is longer than or equal to the second rest time, the controller 14 returns to step S71. In a case in which it is determined in step S74 that the rest time is shorter than the second rest time, the controller 14 proceeds to step S75. In step S75, the controller 14 sets the designated transmission ratio GS so that the transmission ratio at which the human-powered vehicle A is started is decreased. The above-described process completes steps S71 to S75. For example, in a state in which electric power is supplied from the battery BT, the controller 14 repeats steps S71 to S75. In a case in which the first rest time is equal to the second rest time, step S74 can be omitted from the control executed by the control device 12.

Eighth Embodiment

Figure 10:
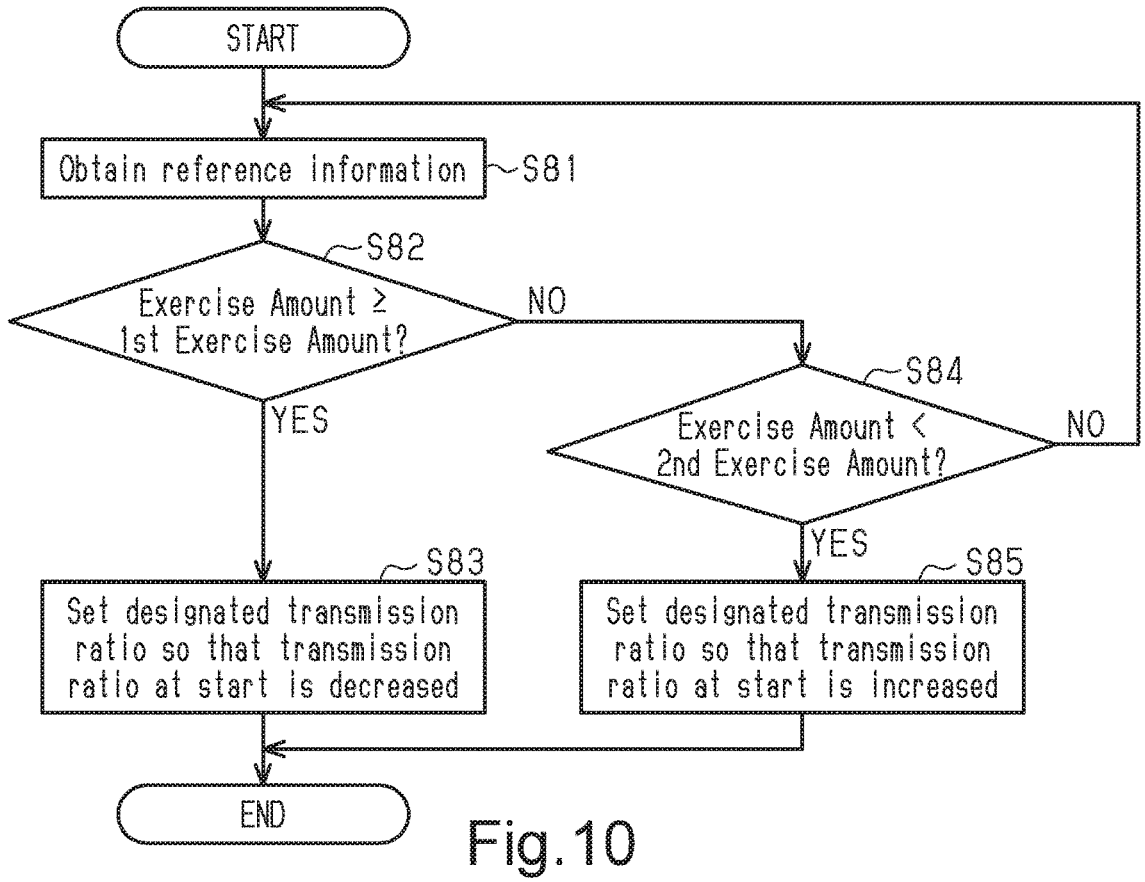
FIG. 10 is a flowchart showing an example of a control executed by the electronic controller of the control device in accordance with an eighth embodiment.

An eighth embodiment of a control for the transmission system 10 will now be described with reference to FIG. 10. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes rider information related to the rider riding the human-powered vehicle A. The rider information includes fatigue information related to fatigue of the rider. The fatigue information includes information related to an exercise amount of the rider. The exercise amount of the rider is, for example, energy consumed by the rider by riding the human-powered vehicle A. In an example, the exercise amount of the rider is a product of power and a driving time. The exercise amount of the rider is expressed in calorie or joule. In the present embodiment, the detection device DD is configured to detect an exercise amount of the rider. The detection device DD includes, for example, various sensors configured to detect an exercise amount of the rider. The detection device DD is provided, for example, on the crank C of the human-powered vehicle A or a cycle computer.

In a case in which the exercise amount of the rider is greater than or equal to a first exercise amount, the controller 14 sets the designated transmission ratio GS so that the transmission ratio at which the human-powered vehicle A is started is decreased. In other words, in a case in which the exercise amount of the rider is greater than or equal to the first exercise amount, the controller 14 sets the designated transmission ratio GS to be less than the designated transmission ratio GS stored in the storage 16. In a case in which the exercise amount of the rider is greater than or equal to a third exercise amount that is greater than the first exercise amount, the controller 14 can set the designated transmission ratio GS so that the transmission ratio at which the human-powered vehicle A is started is further decreased. In a case in which the designated transmission ratio GS stored in the storage 16 is the minimum transmission ratio, the controller 14 maintains the designated transmission ratio GS.

In a case in which the exercise amount of the rider is less than a second exercise amount, the controller 14 sets the designated transmission ratio GS so that the transmission ratio at which the human-powered vehicle A is started is increased or maintains the designated transmission ratio GS. In the present embodiment, in a case in which the exercise amount of the rider is less than the second exercise amount, the controller 14 sets the designated transmission ratio GS so that the transmission ratio at which the human-powered vehicle A is started is increased. In other words, in a case in which the exercise amount of the rider is less than the second exercise amount, the controller 14 sets the designated transmission ratio GS to be greater than the designated transmission ratio GS stored in the storage 16. In a case in which the designated transmission ratio GS stored in the storage 16 is the maximum transmission ratio, the controller 14 maintains the designated transmission ratio GS. The second exercise amount can be equal to the first exercise amount or can differ from the first exercise amount. In a case in which the first exercise amount differs from the second exercise amount, the second exercise amount is less than the first exercise amount.

In a case in which the exercise amount of the rider is greater than or equal to the first exercise amount, the controller 14 can set the designated transmission ratio GS so that the transmission ratio at which the human-powered vehicle A is started is increased or can maintain the designated transmission ratio GS. In a case in which the exercise amount of the rider is less than the second exercise amount, the controller 14 can set the designated transmission ratio GS so that the transmission ratio at which the human-powered vehicle A is started is decreased.

An example of a control executed by the processor 14a of the control device 12 will now be described with reference to FIG. 10.

In step S81, the controller 14 obtains the reference information. More specifically, the controller 14 obtains information related to the exercise amount of the rider from the detection device DD. In step S82, the controller 14 determines whether or not the exercise amount of the rider is greater than or equal to the first exercise amount. In a case in which it is determined in step S82 that the exercise amount of the rider is greater than or equal to the first exercise amount, the controller 14 proceeds to step S83. In step S83, the controller 14 sets the designated transmission ratio GS so that the transmission ratio at which the human-powered vehicle A is started is decreased.

In a case in which it is determined in step S82 that the exercise amount of the rider is less than the first exercise amount, the controller 14 proceeds to step S84. In step S84, the controller 14 determines whether or not the exercise amount of the rider is less than the second exercise amount. In a case in which it is determined in step S84 that the exercise amount of the rider is greater than or equal to the second exercise amount, the controller 14 returns to step S81. In a case in which it is determined in step S84 that the exercise amount of the rider is less than the second exercise amount, the controller 14 proceeds to step S85. In step S85, the controller 14 sets the designated transmission ratio GS so that the transmission ratio at which the human-powered vehicle A is started is increased. The above-described process completes steps S81 to S85. For example, in a state in which electric power is supplied from the battery BT, the controller 14 repeats steps S81 to S85. In a case in which the first exercise amount is equal to the second exercise amount, step S84 can be omitted from the control executed by the control device 12.

Ninth Embodiment

Figure 11:
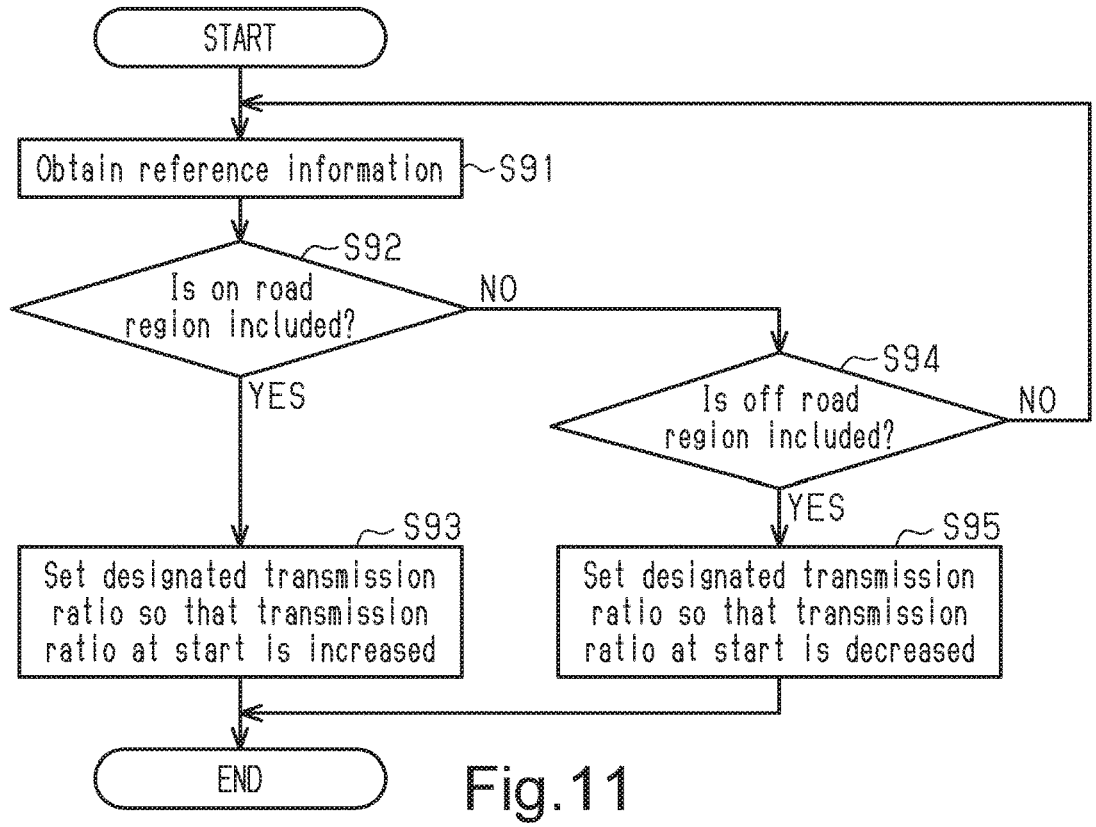
FIG. 11 is a flowchart showing an example of a control executed by the electronic controller of the control device in accordance with a ninth embodiment.

A ninth embodiment of a control for the transmission system 10 will now be described with reference to FIG. 11. The same reference characters are given to those elements that are the same as the corresponding elements of the first embodiment. Such elements will not be described in detail.

The controller 14 sets the designated transmission ratio GS based on reference information. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the reference information includes environment information related to a riding environment of the human-powered vehicle A. The environment information includes information related to a region in which the human-powered vehicle A is ridden. The region in which the human-powered vehicle A is ridden can be a region in which the human-powered vehicle A has been ridden or can be a region in which the human-powered vehicle A is expected to be ridden. In the present embodiment, the detection device DD is configured to detect a region in which the human-powered vehicle A is ridden. The detection device DD includes, for example, various sensors configured to detect a region in which the human-powered vehicle A is ridden. In an example, the detection device DD is a global positioning system (GPS). In this case, the detection device DD is provided, for example, on the handlebar H of the human-powered vehicle A.

In a case in which the region in which the human-powered vehicle A is ridden includes an on road region, the controller 14 sets the designated transmission ratio GS so that the transmission ratio at which the human-powered vehicle A is started is increased or maintains the designated transmission ratio GS. In the present embodiment, in a case in which the region in which the human-powered vehicle A is ridden includes an on road region, the controller 14 sets the designated transmission ratio GS so that the transmission ratio at which the human-powered vehicle A is started is increased. In other words, in a case in which the region in which the human-powered vehicle A is ridden includes an on road region, the controller 14 sets the designated transmission ratio GS to be greater than the designated transmission ratio GS stored in the storage 16. In an example, in a case in which the rate of an on road region in the region in which the human-powered vehicle A is ridden is greater than or equal to a predetermined rate, the controller 14 determines that the region in which the human-powered vehicle A is ridden includes an on road region. In a case in which the designated transmission ratio GS stored in the storage 16 is the maximum transmission ratio, the controller 14 maintains the designated transmission ratio GS.

In a case in which the region in which the human-powered vehicle A is ridden includes an off road region, the controller 14 sets the designated transmission ratio GS so that the transmission ratio at which the human-powered vehicle A is started is decreased. In other words, in a case in which the region in which the human-powered vehicle A is ridden includes an off road region, the controller 14 sets the designated transmission ratio GS to be less than the designated transmission ratio GS stored in the storage 16. In an example, in a case in which the rate of an off road region in the region in which the human-powered vehicle A is ridden is greater than or equal to a predetermined rate, the controller 14 determines that the region in which the human-powered vehicle A is ridden includes an off road region. In a case in which the designated transmission ratio GS stored in the storage 16 is the minimum transmission ratio, the controller 14 maintains the designated transmission ratio GS.

In a case in which the region in which the human-powered vehicle A is ridden includes an on road region, the controller 14 can set the designated transmission ratio GS so that the transmission ratio at which the human-powered vehicle A is started is decreased. In a case in which the region in which the human-powered vehicle A is ridden includes an off road region, the controller 14 can set the designated transmission ratio GS so that the transmission ratio at which the human-powered vehicle A is started is increased or can maintain the designated transmission ratio GS.

An example of a control executed by the processor 14a of the control device 12 will now be described with reference to FIG. 11.

In step S91, the controller 14 obtains the reference information. More specifically, the controller 14 obtains information related to a region in which the human-powered vehicle A is ridden from the detection device DD. In step S92, the controller 14 determines whether or not the region in which the human-powered vehicle A is ridden includes an on road region. In a case in which it is determined in step S92 that the region in which the human-powered vehicle A is ridden includes an on road region, the controller 14 proceeds to step S93. In step S93, the controller 14 sets the designated transmission ratio GS so that the transmission ratio at which the human-powered vehicle A is started is increased.

In a case in which it is determined in step S92 that the region in which the human-powered vehicle A is ridden does not include an on road region, the controller 14 proceeds to step S94. In step S94, the controller 14 determines whether or not the region in which the human-powered vehicle A is ridden includes an off road region. In a case in which it is determined in step S94 that the region in which the human-powered vehicle A is ridden does not include an off road region, the controller 14 returns to step S91. In a case in which it is determined in step S94 that the region in which the human-powered vehicle A is ridden includes an off road region, the controller 14 proceeds to step S95. In step S95, the controller 14 sets the designated transmission ratio GS so that the transmission ratio at which the human-powered vehicle A is started is decreased. The above-described process completes steps S91 to S95. For example, in a state in which electric power is supplied from the battery BT, the controller 14 repeats steps S91 to S95. In a case in which the region in which the human-powered vehicle A is ridden is distinguished between an on road region and an off road region, step S94 can be omitted from the control executed by the control device 12.

Tenth Embodiment

Figure 12:
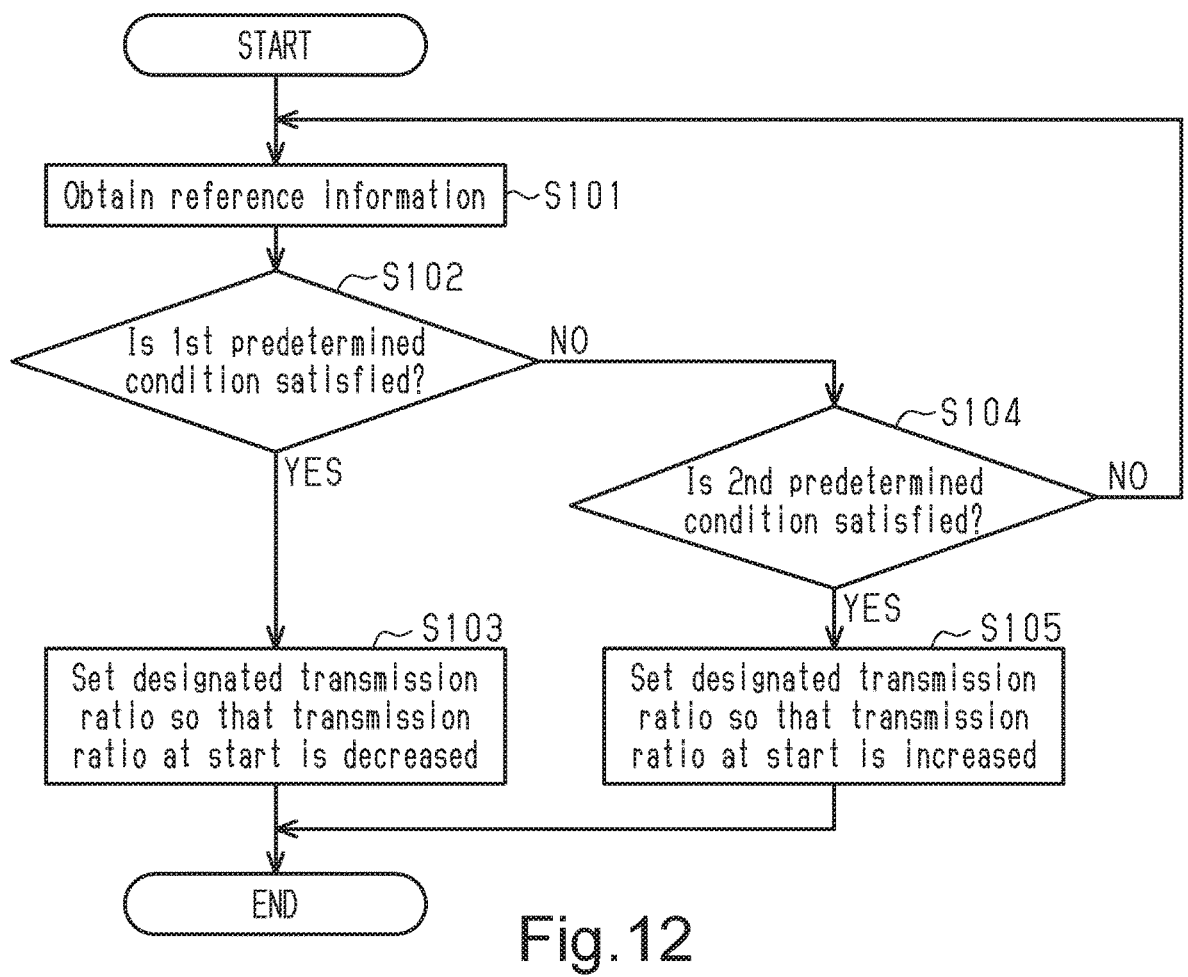
FIG. 12 is a flowchart showing an example of a control executed by the electronic controller of the control device in accordance with a tenth embodiment.

A tenth embodiment of a control for the transmission system 10 will now be described with reference to FIG. 12. The same reference characters are given to those elements that are the same as the corresponding elements of the first embodiment. Such elements will not be described in detail.

The controller 14 sets the designated transmission ratio GS based on the reference information and information related to a gradient of a road surface. The reference information includes at least one of vehicle stop information related to a stopping state of the human-powered vehicle A, riding information related to riding of the human-powered vehicle A, rider information related to the rider riding the human-powered vehicle A, and environment information related to a riding environment of the human-powered vehicle A. In the present embodiment, the detection device DD is configured to detect the reference information and the information related to a gradient of a road surface. The detection device DD includes, for example, various sensors configured to detect elements included in the reference information and a sensor configured to detect a gradient of a road surface.

In a case in which it is determined that a first predetermined condition is satisfied, the controller 14 sets the designated transmission ratio GS so that the transmission ratio at which the human-powered vehicle A is started is decreased. In a case in which at least one of first to tenth conditions is satisfied, the controller 14 determines that the first predetermined condition is satisfied. In a case in which at least one of the first to ninth conditions is satisfied and the tenth condition is satisfied, the controller 14 can determine that the first predetermined condition is satisfied.

In a case in which the transmission ratio at which the human-powered vehicle A is stopped is less than the designated transmission ratio GS, the controller 14 determines that the first condition is satisfied. In a case in which the load on the human-powered vehicle A is greater than or equal to the first load, the controller 14 determines that the second condition is satisfied. In a case in which the elevation gain of the human-powered vehicle A is greater than or equal to the first elevation gain, the controller 14 determines that the third condition is satisfied. In a case in which the heart rate of the rider is increased by the first rate or greater, the controller 14 determines that the fourth condition is satisfied. In a case in which the load on the human-powered vehicle A is increased by the second rate or greater, the controller 14 determines that the fifth condition is satisfied.

In a case in which the driving time is longer than or equal to the first driving time, the controller 14 determines that the sixth condition is satisfied. In a case in which the rest time is shorter than the second rest time, the controller 14 determines that the seventh condition is satisfied. In a case in which the exercise amount of the rider is greater than or equal to the first exercise amount, the controller 14 determines that the eighth condition is satisfied. In a case in which the region in which the human-powered vehicle A is ridden includes an off road region, the controller 14 determines that the ninth condition is satisfied. In a case in which the gradient of a road surface is greater than or equal to a first gradient, the controller 14 determines that the tenth condition is satisfied. In a case in which the designated transmission ratio GS stored in the storage 16 is the minimum transmission ratio, the controller 14 maintains the designated transmission ratio GS. In the first to ninth conditions used for determination of the first predetermined condition, conditions related to elements that are not included in the reference information can be omitted if appropriate.

In a case in which it is determined that a second predetermined condition is satisfied, the controller 14 sets the designated transmission ratio GS so that the transmission ratio at which the human-powered vehicle A is started is increased or maintains the designated transmission ratio GS. In the present embodiment, in a case in which it is determined that the second predetermined condition is satisfied, the controller 14 sets the designated transmission ratio GS so that the transmission ratio at which the human-powered vehicle A is started is increased. In a case in which at least one of eleventh to twentieth conditions is satisfied, the controller 14 determines that the second predetermined condition is satisfied. In a case in which at least one of the eleventh to nineteenth conditions is satisfied and the twentieth condition is satisfied, the controller 14 can determine that the second predetermined condition is satisfied.

In a case in which the transmission ratio at which the human-powered vehicle A is stopped is greater than or equal to the designated transmission ratio GS, the controller 14 determines that the eleventh condition is satisfied. In a case in which the load on the human-powered vehicle A is less than the second load, the controller 14 determines that the twelfth condition is satisfied. In a case in which the elevation gain of the human-powered vehicle A is less than the second elevation gain, the controller 14 determines that the thirteenth condition is satisfied. In a case in which the heart rate of the rider is less than the reference heart rate, the controller 14 determines that the fourteenth condition is satisfied. In a case in which the load on the human-powered vehicle A is less than the reference load, the controller 14 determines that the fifteenth condition is satisfied. In a case in which the driving time is shorter than the second driving time, the controller 14 determines that the sixteenth condition is satisfied. In a case in which the rest time is longer than or equal to the first rest time, the controller 14 determines that the seventeenth condition is satisfied. In a case in which the exercise amount of the rider is less than the second exercise amount, the controller 14 determines that the eighteenth condition is satisfied. In a case in which the region in which the human-powered vehicle A is ridden includes an on road region, the controller 14 determines that the nineteenth condition is satisfied. In a case in which the gradient of a road surface is less than a second gradient, the controller 14 determines that the twentieth condition is satisfied. The second gradient can be equal to the first gradient or can differ from the first gradient. In a case in which the first gradient differs from the second gradient, the second gradient is less than the first gradient. In a case in which the designated transmission ratio GS stored in the storage 16 is the maximum transmission ratio, the controller 14 maintains the designated transmission ratio GS. In the tenth to nineteenth conditions used for determination of the second predetermined condition, conditions related to elements that are not included in the reference information can be omitted if appropriate.

In a case in which it is determined that the first predetermined condition is satisfied, the controller 14 can set the designated transmission ratio GS so that the transmission ratio at which the human-powered vehicle A is started is increased or can maintain the designated transmission ratio GS. In a case in which it is determined that the second predetermined condition is satisfied, the controller 14 can set the designated transmission ratio GS so that the transmission ratio at which the human-powered vehicle A is started is decreased.

An example of a control executed by the processor 14$a$ of the control device 12 will now be described with reference to FIG. 12.

In step S101, the controller 14 obtains various kinds of information. More specifically, the controller 14 obtains the reference information and the information related to the gradient of a road surface from the detection device DD. In step S102, the controller 14 determines whether or not the first predetermined condition is satisfied. In a case in which it is determined in step S102 that the first predetermined condition is satisfied, the controller 14 proceeds to step S103. In step S103, the controller 14 sets the designated transmission ratio GS so that the transmission ratio at which the human-powered vehicle A is started is decreased.

In a case in which it is determined in step S102 that the first predetermined condition is not satisfied, the controller 14 proceeds to step S104. In step S104, the controller 14 determines whether or not the second predetermined condition is satisfied. In a case in which it is determined in step S104 that the second predetermined condition is not satisfied, the controller 14 proceeds to step S101. In a case in which it is determined in step S104 that the second predetermined condition is satisfied, the controller 14 proceeds to step S105. In step S105, the controller 14 sets the designated transmission ratio GS so that the transmission ratio at which the human-powered vehicle A is started is increased. The above-described process completes steps S101 to S105. For example, in a state in which electric power is supplied from the battery BT, the controller 14 repeats steps S101 to S105. Depending on a condition that satisfies the first predetermined condition, step S104 can be omitted from the control executed by the control device 12.

Modifications

The description related to the above embodiments exemplifies, without any intention to limit, applicable forms of a control device and a transmission system according to the present disclosure. The control device and the transmission system according to the present disclosure can be applied to, for example, modifications of the embodiments that are described below and combinations of at least two of the modifications that do not contradict each other. In the following modifications, the same reference characters are given to those elements that are the same as the corresponding elements of the above embodiments. Such elements will not be described in detail.

Control executed by the controller 14 in the tenth embodiment can be changed in any manner. In an example, the controller 14 sets the designated transmission ratio GS based on the reference information and the information related to propulsion assistance of the human-powered vehicle A. In a case in which at least one of the first to ninth conditions and a twenty-first condition is satisfied, the controller 14 determines that the first predetermined condition is satisfied. In a case in which at least one of the first to ninth conditions is satisfied and the twenty-first condition is satisfied, the controller 14 can determine that the first predetermined condition is satisfied. In a case in which the assist ratio of the human-powered vehicle A is greater than or equal to a first assist ratio, the controller 14 determines that the twenty-first condition is satisfied. The assist ratio is a ratio of output of the motor E1 to human driving force.

For example, in a case in which at least one of the eleventh to nineteenth conditions and a twenty-second condition is satisfied, the controller 14 determines that the second predetermined condition is satisfied. In a case in which at least one of the eleventh to nineteenth conditions is satisfied and the twenty-second condition is satisfied, the controller 14 can determine that the second predetermined condition is satisfied. In a case in which the assist ratio of the human-powered vehicle A is less than a second assist ratio, the controller 14 determines that the twenty-second condition is satisfied. The second assist ratio can be equal to the first assist ratio or can differ from the first assist ratio. In a case in which the first assist ratio differs from the second assist ratio, the second assist ratio is less than the first assist ratio. The controller 14 can set the designated transmission ratio GS based on the reference information, the information related to a gradient of a road surface, and the information related to propulsion assistance of the human-powered vehicle A.

Information included in the reference information can be changed in any manner. In a first example, the reference information includes rider information related to the rider riding the human-powered vehicle A. The rider information includes information related to weight of the rider. In a case in which the weight of the rider is greater than or equal to a first weight, the controller 14 sets the designated transmission ratio GS so that the transmission ratio at which the human-powered vehicle A is started is decreased. In a case in which the weight of the rider is less than a second weight, the controller 14 sets the designated transmission ratio GS so that the transmission ratio at which the human-powered vehicle A is started is increased or maintains the designated transmission ratio GS. The second weight can be equal to the first weight or can differ from the first weight. In a case in which the first weight differs from the second weight, the second weight is less than the first weight. In a case in which the weight of the rider is greater than or equal to the first weight, the controller 14 can set the designated transmission ratio GS so that the transmission ratio at which the human-powered vehicle A is started is increased or can maintain the designated transmission ratio GS. In a case in which the weight of the rider is less than the second weight, the controller 14 can set the designated transmission ratio GS so that the transmission ratio at which the human-powered vehicle A is started is decreased.

In a second example, the reference information includes rider information related to the rider riding the human-powered vehicle A. The rider information includes information related to gender of the rider. In a case in which the rider is a female, the controller 14 sets the designated transmission ratio GS so that the transmission ratio at which the human-powered vehicle A is started is decreased. In a case in which the rider is a male, the controller 14 sets the designated transmission ratio GS so that the transmission ratio at which the human-powered vehicle A is started is increased or maintains the designated transmission ratio GS. In a case in which the rider is a female, the controller 14 can set the designated transmission ratio GS so that the transmission ratio at which the human-powered vehicle A is started is increased or can maintain the designated transmission ratio GS. In a case in which the rider is a male, the controller 14 can set the designated transmission ratio GS so that the transmission ratio at which the human-powered vehicle A is started is decreased.

In a third example, the reference information includes rider information related to the rider riding the human-powered vehicle A. The rider information includes information related to age of the rider. In a case in which the age of the rider is greater than or equal to a first age, the controller 14 sets the designated transmission ratio GS so that the transmission ratio at which the human-powered vehicle A is started is decreased. In a case in which the age of the rider is less than a second age, the controller 14 sets the designated transmission ratio GS so that the transmission ratio at which the human-powered vehicle A is started is increased or maintains the designated transmission ratio GS. The second age can be equal to the first age or can differ from the first age. In a case in which the first age differs from the second age, the second age is less than the first age. In a case in which the age of the rider is greater than or equal to the first age, the controller 14 can set the designated transmission ratio GS so that the transmission ratio at which the human-powered vehicle A is started is increased or can maintain the designated transmission ratio GS. In a case in which the age of the rider is less than the second age, the controller 14 can set the designated transmission ratio GS so that the transmission ratio at which the human-powered vehicle A is started is decreased.

The control executed by the control device 12 based on the reference information can be changed in any manner. In an example, in a case in which it is determined that a third predetermined condition is satisfied, the controller 14 sets the designated transmission ratio GS so that the transmission ratio at which the human-powered vehicle A is started is decreased. For example, in a case in which at least two of the first to ninth conditions and twenty-third to twenty-fifth conditions are satisfied, the controller 14 determines that the third predetermined condition is satisfied. The determination process related to the first to ninth conditions is the same as that in the tenth embodiment. In a case in which the weight of the rider is greater than or equal to the first weight, the controller 14 determines that the twenty-third condition is satisfied. In a case in which the rider is a female, the controller 14 determines that the twenty-fourth condition is satisfied. In a case in which the age of the rider is greater than the first age, the controller 14 determines that the twenty-fifth condition is satisfied. In a case in which the designated transmission ratio GS stored in the storage 16 is the minimum transmission ratio, the controller 14 maintains the designated transmission ratio GS. In the first to ninth conditions and twenty-third to twenty-fifth conditions used for determination of the third predetermined condition, conditions related to elements that are not included in the reference information can be omitted if appropriate.

In a case in which a fourth predetermined condition is satisfied, the controller 14 sets the designated transmission ratio GS so that the transmission ratio at which the human-powered vehicle A is started is increased or maintains the designated transmission ratio GS. For example, in a case in which at least two of the eleventh to nineteenth conditions and twenty-sixth to twenty-eighth conditions are satisfied, the controller 14 determines that a fourth predetermined condition is satisfied. The determination process related to the eleventh to nineteenth conditions is the same as that in the tenth embodiment. In a case in which the weight of the rider is less than the second weight, the controller 14 determines that the twenty-sixth condition is satisfied. In a case in which the rider is a male, the controller 14 determines that the twenty-seventh condition is satisfied. In a case in which the age of the rider is less than the second age, the controller 14 determines that the twenty-eighth condition is satisfied. In a case in which the designated transmission ratio GS stored in the storage 16 is the maximum transmission ratio, the controller 14 maintains the designated transmission ratio GS. In the tenth to nineteenth conditions and twenty-sixth to twenty-eighth conditions used for determination of the fourth predetermined condition, conditions related to elements that are not included in the reference information can be omitted if appropriate.

The type of the human-powered vehicle A can be changed in any manner. In a first example, the human-powered vehicle A is a road bike, a mountain bike, a cross bike, a city bike, a cargo bike, or a recumbent bike. In a second example, the human-powered vehicle A is a kick scooter.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A control device comprising:
    an electronic controller configured to control a transmission device of a human-powered vehicle; and
    a storage that stores a designated transmission ratio in an updateable manner, the designated transmission ratio being a transmission ratio to which the transmission device is controlled by the electronic controller at a time when the human-powered vehicle is stopped so that the transmission device is set to the designated transmission ratio before the human-powered vehicle is started into motion from a stopped state,
    the electronic controller being further configured to
        acquire reference information;
        determine, based on the reference information, whether to maintain the designated transmission ratio or update the designated transmission ratio to be used a next time the vehicle is started,
        execute a control to maintain or update the designated transmission ratio, and
        control the transmission device to the designated transmission ratio at the time when the human-powered vehicle is stopped,
    the reference information excluding information related to a gradient of a road surface, information related to manual operation of the transmission device, and information related to propulsion assistance of the human-powered vehicle.

2. The control device according to claim 1, wherein
the reference information includes at least one of vehicle stop information related to a stopping state of the human-powered vehicle, riding information related to riding of the human-powered vehicle, rider information related to a rider riding the human-powered vehicle, and environment information related to a riding environment of the human-powered vehicle.

3. The control device according to claim 2, wherein
the vehicle stop information includes information related to a transmission ratio at which the human-powered vehicle is stopped.

4. The control device according to claim 3, wherein
the electronic controller is configured to maintain the designated transmission ratio upon determining the transmission ratio at which the human-powered vehicle is stopped is larger than or equal to the designated transmission ratio.

5. The control device according to claim 3, wherein
the electronic controller is configured to update the designated transmission ratio to be equal to the transmission ratio at which the human-powered vehicle is stopped upon determining the transmission ratio at which the human-powered vehicle is stopped is smaller than the designated transmission ratio.

6. The control device according to claim 2, wherein
the riding information includes information related to a load on the human-powered vehicle.

7. The control device according to claim 6, wherein
the electronic controller is configured to update the designated transmission ratio so that the designated transmission ratio is decreased upon determining the load on the human-powered vehicle is larger than or equal to a first load.

8. The control device according to claim 6, wherein
the electronic controller is configured to maintain the designated transmission ratio or update the designated transmission ratio so that the designated transmission ratio is increased upon determining the load on the human-powered vehicle is smaller than a second load.

9. The control device according to claim 6, wherein
the load on the human-powered vehicle includes at least one of cadence, torque acting on a crank of the human-powered vehicle, and power.

10. The control device according claim 2, wherein
the riding information includes information related to an elevation gain of the human-powered vehicle.

11. The control device according to claim 10, wherein
the electronic controller is configured to update the designated transmission ratio so that the designated transmission ratio is decreased upon determining the elevation gain is larger than or equal to a first elevation gain.

12. The control device according to claim 10, wherein
the electronic controller is configured to maintain the designated transmission ratio or update the designated transmission ratio so that the designated transmission ratio is increased upon determining the elevation gain is smaller than a second elevation gain.

13. The control device according to claim 2, wherein
the rider information includes fatigue information related to fatigue of the rider.

14. The control device according to claim 13, wherein
the fatigue information includes information related to a change in biological information.

15. The control device according to claim 14, wherein
the biological information includes information related to a heart rate of the rider.

16. The control device according to claim 15, wherein
the electronic controller updates the designated transmission ratio so that the designated transmission ratio is decreased upon determining the heart rate is increased by a first rate or greater.

17. The control device according to claim 13, wherein the fatigue information includes information related to a change in a load on the human-powered vehicle.

18. The control device according to claim 17, wherein the electronic controller updates the designated transmission ratio so that the designated transmission ratio is decreased upon determining the load on the human-powered vehicle is increased by a second rate or greater.

19. The control device according to claim 17, wherein the load on the human-powered vehicle includes at least one of cadence, torque acting on a crank of the human-powered vehicle, and power.

20. The control device according to claim 13, wherein the fatigue information includes information related to a driving time.

21. The control device according to claim 20, wherein the electronic controller is configured to update the designated transmission ratio so that the designated transmission ratio is decreased upon determining the driving time is longer than or equal to a first driving time.

22. The control device according to claim 20, wherein the electronic controller is configured to maintain the designated transmission ratio or update the designated transmission ratio so that the designated transmission ratio is increased upon determining the driving time is shorter than a second driving time.

23. The control device according to claim 13, wherein the fatigue information includes information related to a rest time.

24. The control device according to claim 23, wherein the electronic controller is configured to maintain the designated transmission ratio or update the designated transmission ratio so that the designated transmission ratio is increased upon determining the rest time is longer than or equal to a first reset time.

25. The control device according to claim 13, wherein the fatigue information includes information related to an exercise amount of the rider.

26. The control device according to claim 25, wherein the electronic controller is configured to update the designated transmission ratio so that the designated transmission ratio is decreased upon determining the exercise amount is greater than or equal to a first exercise amount.

27. The control device according to claim 25, wherein the electronic controller is configured to maintain the designated transmission ratio or update the designated transmission ratio so that the designated transmission ratio is increased upon determining the exercise amount is less than a second exercise amount.

28. The control device according to claim 2, wherein the environment information includes information related to a region in which the human-powered vehicle is ridden.

29. The control device according to claim 28, wherein the electronic controller is configured to maintain the designated transmission ratio or update the designated transmission ratio so that the designated transmission ratio is increased upon determining the region includes an on road region.

30. The control device according to claim 28, wherein the electronic controller is configured to update the designated transmission ratio so that the designated transmission ratio is decreased upon determining the region includes an off road region.

31. The control device according to claim 2, wherein the electronic controller is further configured to take the gradient of the road surface into account when updating the designated transmission ratio.

32. The control device according to claim 1, wherein the electronic controller is configured to control the transmission device as the human-powered vehicle stops so that the transmission ratio at which the vehicle is started becomes equal to the designated transmission ratio.

33. A transmission system comprising the control device according to claim 1 and further comprising:
the transmission device.

34. The transmission system according to claim 33, wherein
the transmission device includes an internal shifting device.

35. A control device comprising:
an electronic controller configured to control a transmission device of a human-powered vehicle so that a transmission ratio at which the vehicle is started becomes equal to a designated transmission ratio;
the electronic controller being configured to set the designated transmission ratio based on reference information that excludes information related to a gradient of a road surface, information related to manual operation of the transmission device, and information related to propulsion assistance of the human-powered vehicle,
the reference information including at least one of vehicle stop information related to a stopping state of the human-powered vehicle, riding information related to riding of the human-powered vehicle, rider information related to a rider riding the human-powered vehicle, and environment information related to a riding environment of the human-powered vehicle
the rider information including fatigue information related to fatigue of the rider, the fatigue information including information related to a rest time, and
the electronic controller being configured to set the designated transmission ratio so that the transmission ratio at which the vehicle is started is started is decreased upon determining the rest time is shorter than a second rest time.

36. A control device comprising:
an electronic controller configured to control a transmission device of a human-powered vehicle; and
a storage that stores a designated transmission ratio in an updatable manner, the designated transmission ratio being a transmission ratio to which the transmission device is controlled by the electronic controller as a crank of the human-powered vehicle is rotated so that the transmission device is set to the designated transmission ratio as the human-powered vehicle is started into motion from a stopped state,
the electronic controller being further configured to
acquire reference information,
determine, based on the reference information, whether to maintain the designated transmission ratio or update the designated transmission ratio to be used a next time the vehicle is started,
execute a control to maintain or update the designated transmission ratio, and
control the transmission device as the crank of the human-powered vehicle rotates when the human-powered vehicle is started so that the transmission ratio at which the vehicle is started is equal to the designated transmission ratio, the reference information excluding information related to a gradient of a road surface, information related to manual operation of the transmission device, and information related to propulsion assistance of the human-powered vehicle.

37. A transmission system comprising the control device according to claim 36 and further comprising:
the transmission device.

38. The transmission system according to claim 37, wherein
the transmission device includes an external shifting device.

39. The transmission system according to claim 38, wherein
the external shifting device includes a rear derailleur.

40. The transmission system according to claim 38, wherein
the internal shifting device is provided in a hub of a rear wheel of the human-powered vehicle.

* * * * *